United States Patent
Kira

(10) Patent No.: US 11,167,928 B2
(45) Date of Patent: Nov. 9, 2021

(54) BOLT SUPPLY DEVICE

(71) Applicant: TOYOTA JIDOSHA KABUSHIKI KAISHA, Toyota (JP)

(72) Inventor: Kazuhiko Kira, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/077,498

(22) Filed: Oct. 22, 2020

(65) Prior Publication Data

US 2021/0261339 A1 Aug. 26, 2021

(30) Foreign Application Priority Data

Feb. 21, 2020 (JP) .............................. JP2020-027856

(51) Int. Cl.
    B65G 11/08    (2006.01)
    B25B 23/04    (2006.01)
    B65G 1/08     (2006.01)
    B65G 47/14    (2006.01)

(52) U.S. Cl.
    CPC ............ *B65G 11/081* (2013.01); *B25B 23/04* (2013.01); *B65G 1/08* (2013.01); *B65G 11/086* (2013.01); *B65G 47/1478* (2013.01)

(58) Field of Classification Search
    CPC ......... B25B 23/06; B25B 25/065; B25B 3/04; B65G 11/081; B65G 11/086; B65G 47/1478; B65G 1/08
    USPC ........ 221/165, 194; 198/389, 397.01–397.06
    See application file for complete search history.

(56) References Cited

U.S. PATENT DOCUMENTS

| | | | | |
|---|---|---|---|---|
| 1,692,456 | A * | 11/1928 | Lynch ................ | B65G 47/1478 221/162 |
| 2,790,526 | A * | 4/1957 | Donnelly ............... | G07F 11/34 193/27 |
| 2,840,211 | A * | 6/1958 | Zawaski .............. | B65G 11/203 193/27 |
| 3,779,422 | A * | 12/1973 | Mori .................. | B65G 47/1478 221/10 |
| 4,222,495 | A * | 9/1980 | Kaneko ............. | B65G 47/1478 221/264 |

(Continued)

FOREIGN PATENT DOCUMENTS

| | | | | |
|---|---|---|---|---|
| EP | | 3015407 A1 * | 5/2016 | ............ B23P 19/004 |
| EP | | 3025595 A1 * | 6/2016 | ............... A24C 5/35 |

(Continued)

*Primary Examiner* — Mark A Deuble
(74) *Attorney, Agent, or Firm* — Oliff PLC

(57) ABSTRACT

A bolt supply device includes a slide plate inclined to a vertical direction; and a groove portion formed in the slide plate and having a width that allows passing of a screw portion of a bolt and prevents passing of a flange portion of the bolt. The groove portion includes a first groove configured such that an angle formed between a line extending in an up-down direction along the slide plate and the first groove is a first angle; and a second groove connected to a lower end of the first groove and configured such that an angle formed between the line extending in the up-down direction along the slide plate and the second groove is a second angle smaller than the first angle. The bolt take-out portion is set in the groove portion at a lower end or below the lower end of the second groove.

5 Claims, 22 Drawing Sheets

(56) References Cited

U.S. PATENT DOCUMENTS 4,416,172 A * 11/1983 Medinger ............... B25B 23/06
  81/57.37
4,450,948 A *  5/1984 Naito ................. B65G 47/1478
  198/389
5,392,954 A *  2/1995 Gartz ...................... B21J 15/32
  221/161

FOREIGN PATENT DOCUMENTS

JP    56061214 A * 5/1981
JP    2018-052661 A   4/2018

* cited by examiner

BOLT SUPPLY DEVICE

CROSS-REFERENCE TO RELATED APPLICATION

This application claims priority to Japanese Patent Application No. 2020-027856 filed on Feb. 21, 2020, incorporated herein by reference in its entirety.

BACKGROUND

1. Technical Field

The disclosure relates to a bolt supply device.

2. Description of Related Art

As a means to automatically supply bolts in the production line or the like, a device that aligns the bolts by a parts feeder including a vibrator is widely used. On the other hand, there has been developed a bolt supply device that has a structure small in size and not including a vibrator and aligns bolts at a predetermined position.

For example, a bolt supply device described in Japanese Unexamined Patent Application Publication No. 2018-52661 (JP 2018-52661 A) includes a bolt throw-in portion into which bolts are thrown, a V-shaped guide disposed below the bolt throw-in portion, and a rotation promotion plate. The rotation promotion plate has an upper surface formed with a U-shaped groove. The bolt thrown into and dropping from the bolt throw-in portion comes in contact with the U-shaped groove so that the bolt is changed in direction and then drops to the V-shaped guide.

SUMMARY

The parts feeder described above is large in size, and further, the noise from the vibrator degrades the work environment. On the other hand, the bolt supply device described above does not include a mechanism for automatically supplying the bolts. There has been no bolt supply device that is small in size, that does not include a vibrator, and that can automatically supply bolts and align them at a predetermined position.

The disclosure has been made in order to solve such a problem and provides a bolt supply device that is small in size and suppresses the degradation of the work environment.

One aspect of the disclosure relates to a bolt supply device that aligns bolts in a bolt take-out portion. The bolts each have a head portion including a flange portion and a screw portion protruding from the flange portion. The bolt supply device includes a slide plate disposed to be inclined to a vertical direction; and a groove portion formed in the slide plate and having a width that allows passing of the screw portion and prevents passing of the flange portion. The groove portion includes a first groove configured such that an angle formed between a line extending in an up-down direction along the slide plate and the first groove is a first angle; and a second groove connected to a lower end of the first groove and configured such that an angle formed between the line extending in the up-down direction along the slide plate and the second groove is a second angle smaller than the first angle. The bolt take-out portion is set in the groove portion at a lower end of the second groove or below the lower end of the second groove.

With this configuration, the bolt supply device makes it possible to cause the dropping speed of the bolt moving in the second groove to be higher than the dropping speed of the bolt moving in the first groove.

In the bolt supply device according to the above-described aspect, the second groove may be set to a length such that, in a state where the bolts are filled in the bolt take-out portion, the center of the bolt is disposed in a connecting portion connected to the first groove. With this configuration, the bolt supply device can set the lower end of the second groove to a bolt take-out position.

In the bolt supply device according to the above-described aspect, the groove portion may further include a third groove connected to the lower end of the second groove and bent downward at 90 degrees from the second groove along the slide plate. In this case, the third groove may be set to a length such that, in the state where the bolts are filled in the bolt take-out portion, the center of the bolt is disposed in a connecting portion connected to the second groove. The groove portion may further include a fourth groove connected to a lower end of the third groove and bent downward along the slide plate, the fourth groove having a lower end set to the bolt take-out portion. In this case, the fourth groove may be set to a length such that, in the state where the bolts are filled in the bolt take-out portion, the center of the bolt is disposed in a connecting portion connected to the third groove. With this configuration, the bolt supply device can set a plurality of bolt take-out portions in a series of grooves of the groove portion.

The bolt supply device according to the above-described aspect may further include a cover at the lower end of the third groove, the cover configured to restrict a movement of the bolt in a direction in which the head portion floats up. With this configuration, the bolt supply device can suppress a state in which the bolts dropping along the slide plate float up so that the flange portions of the adjacent bolts overlap each other.

According to the disclosure, it is possible to provide a bolt supply device that is small in size and suppresses the degradation of the work environment.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The disclosure will be described below with reference to an embodiment of the disclosure, but this is not intended to limit the disclosure in the claims to the following embodiment. Further, all the configuration described in the embodiment is not necessarily essential as means for solving the problem. For clarification of description, the following description and the drawings are omitted or simplified as appropriate. In the respective drawings, the same signs are assigned to the same elements, and a duplicate description thereof is omitted as needed.

Outline of Bolt Supply Device

Figure 1:
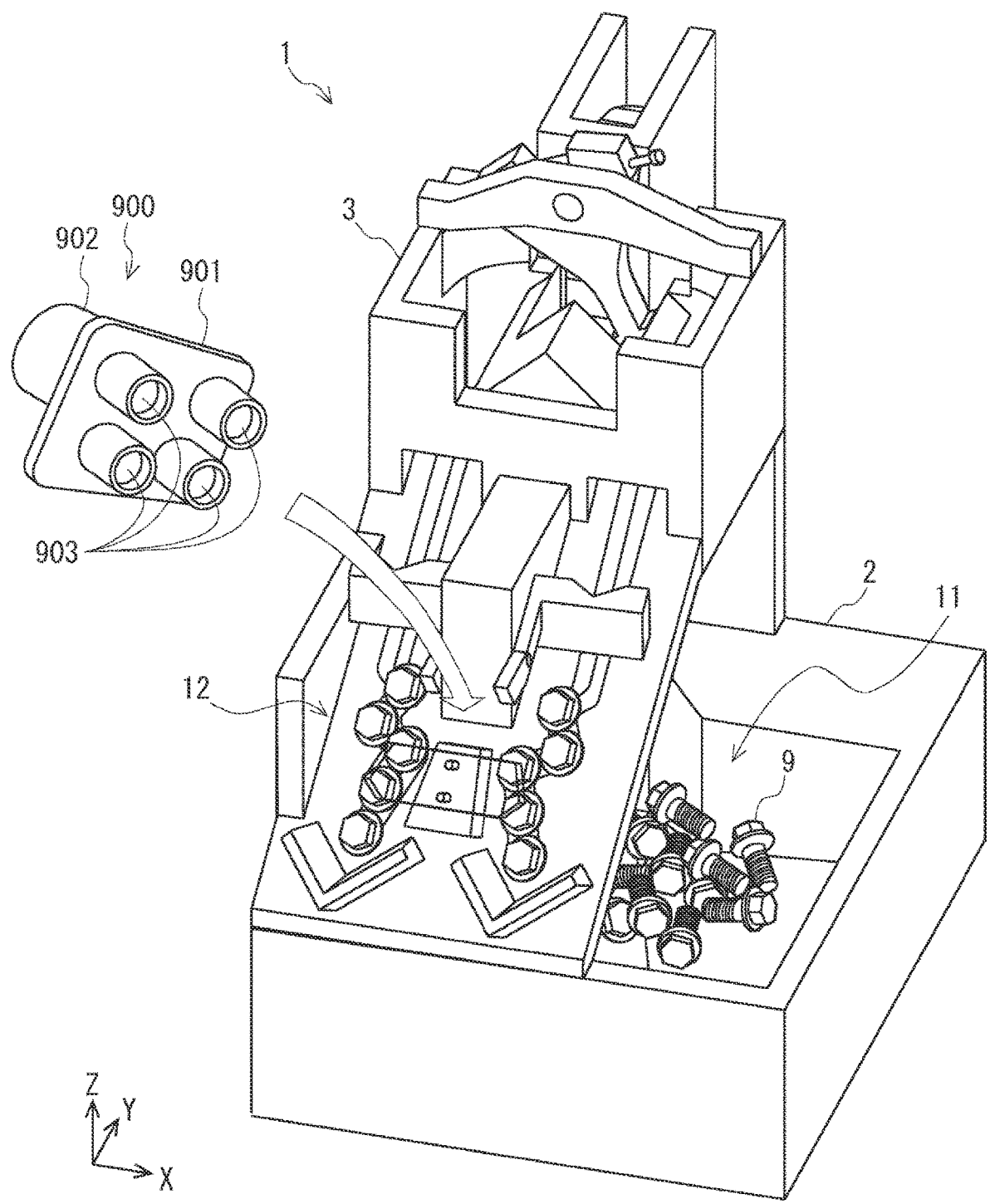
FIG. 1 is a schematic diagram of a bolt supply device according to an embodiment of the disclosure.

Hereinafter, the outline of a bolt supply device 1 according to an embodiment of the disclosure will be described. FIG. 1 is a schematic diagram of the bolt supply device 1 according to the embodiment. The bolt supply device 1 illustrated in FIG. 1 is in a state in which a plurality of thrown-in bolts is supplied to a predetermined position.

Figure 2:
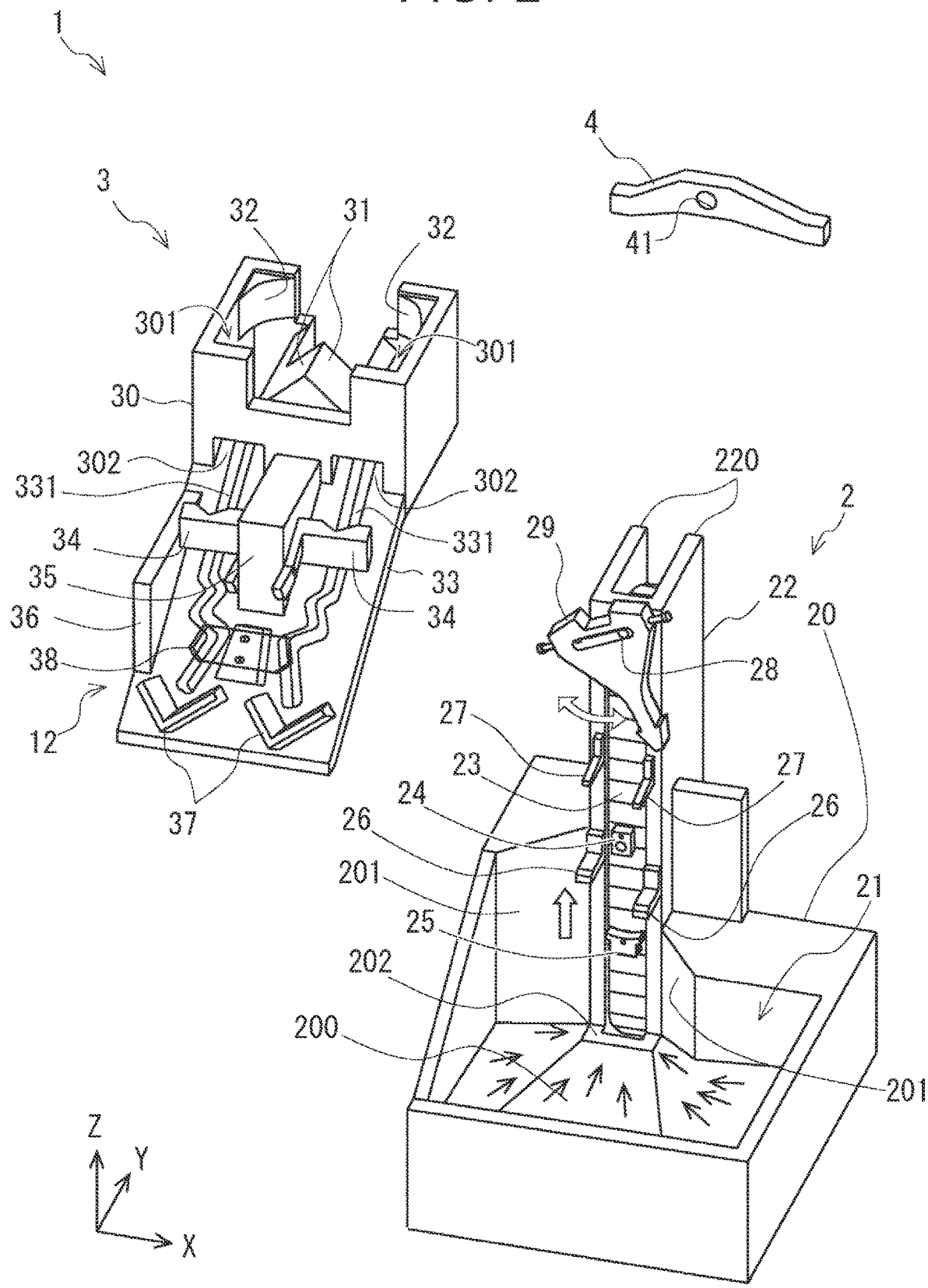
FIG. 2 is an exploded perspective view of the bolt supply device.

In FIG. 1, a right-handed orthogonal coordinate system is given for convenience of explaining the positional relationship between the constituent elements. In FIG. 2 and subsequent figures, when orthogonal coordinate systems are given, the X-, Y-, and Z-axis directions in FIG. 1 and the X-, Y-, and Z-axis directions of these orthogonal coordinate systems respectively coincide with each other. In this embodiment, the X-axis direction may also be referred to as the right-left direction, the X-axis positive side as the right side, and the X-axis negative side as the left side. The Y-axis direction may also be referred to as the front-rear direction, the Y-axis positive side as the rear side, and the Y-axis negative side as the front side. The Z-axis direction may also be referred to as the vertical direction or the up-down direction, the Z-axis positive side as the upper side, and the Z-axis negative side as the lower side.

The bolt supply device 1 illustrated in FIG. 1 has a function to automatically supply hexagon flange bolts (hereinafter simply referred to as "bolts") to a predetermined position. The bolt supply device 1 includes a bolt throw-in portion 11 and a bolt take-out portion 12. A user of the bolt supply device 1 throws a plurality of bolts 9 into the bolt throw-in portion 11 and activates the bolt supply device 1. The bolt supply device 1 supplies the thrown-in bolts 9 to the bolt take-out portion 12.

The bolt supply device 1 in this embodiment realizes the following function by absorbing the bolts 9 by magnetic force. Therefore, the bolts 9 in this embodiment are made of a material composed mainly of iron, stainless steel, copper, or the like.

The user of the bolt supply device 1 performs, for example, an assembly operation using the bolts 9. The user uses the bolt supply device 1, for example, for setting the bolts 9 to a tool 900 illustrated in FIG. 1. The tool 900 includes a base portion 901 having a rectangular plate shape, a knob portion 902 on one side of the base portion 901, and socket portions 903 on the opposite side of the base portion 901 from the knob portion 902. The user places the tool 900 at a preset position of the bolt supply device 1 and then takes up the tool 900. The bolts 9 are respectively set in the socket portions 903 of the tool 900 taken up by the user.

The bolt supply device 1 includes, as its main configuration, a bolt allocation unit 2 and a bolt alignment unit 3. The bolt allocation unit 2 allocates the bolts 9, thrown into the bolt throw-in portion 11, to the bolt alignment unit 3. The bolt alignment unit 3 aligns the allocated bolts 9 in the bolt take-out portion 12.

Referring to FIG. 2, the bolt allocation unit 2 and the bolt alignment unit 3 will be described. FIG. 2 is an exploded perspective view of the bolt supply device 1. As illustrated in FIG. 2, the bolt supply device 1 is configured such that the bolt alignment unit 3 is disposed in an upper portion of the bolt allocation unit 2. The bolt supply device 1 further includes a support portion 4.

Outline of Bolt Allocation Unit 2

Hereinafter, the outline of the bolt allocation unit 2 will be described. The bolt allocation unit 2 includes, as its main configuration, a base block 20 and a bolt conveying block 22.

The base block 20 has a rectangular prism shape with an upper surface open and with a bottom surface in contact with a floor surface. The base block 20 has an opening 21 at its upper surface and a space in its inside with a rectangular prism shape for receiving the bolts 9 therein. In the space for receiving the bolts 9, the base block 20 includes a bottom plate 200, side plates 201, and a bolt storage portion 202. The bottom plate 200 is formed by a plurality of inclined surfaces in such a way that the height is lowered from the outer side of the base block 20 toward the bolt storage portion 202. In other words, the bottom plate 200 has a mortar shape.

The side plates 201 are provided upright in such a way that the two side plates 201 are respectively in contact with both sides of the bolt conveying block 22 provided adjacent to the bolt storage portion 202 and form an arbitrary angle less than 180 degrees. With this configuration of the side plates 201, the bolts 9 are easily collected to the bolt storage portion 202.

The bolt storage portion 202 is a portion corresponding to a bottom portion of the mortar shape described above. The bolt storage portion 202 is provided in a region where a later-described first bolt conveying portion 24 ascends. With this configuration of the bottom plate 200 and the side plates 201, the bolts 9 roll down to the bolt storage portion 202 due to gravity so that the bolts 9 are easily collected to the bolt storage portion 202. The bolt storage portion 202 is configured to be in contact with the bolt conveying block 22 and is provided in a region where a later-described bolt absorbing portion ascends.

The bottom plate 200, the side plates 201, and the bolt storage portion 202 may be in the form of flat surfaces or curved surfaces or may be continuously formed.

The bolt conveying block 22 has a shape in which two plate-like members 220 extending vertically in parallel to each other sandwich both end portions of a conveyor 23 in its width direction. The bolt conveying block 22 is disposed so that portions of the plate-like members 220 at a relatively low position (the low position) are in contact with the bolt storage portion 202. The bolt conveying block 22 conveys upward the bolts 9 collected to the bolt storage portion 202 and allocates the conveyed bolts 9 in two directions at a position higher than the bolt storage portion 202 (the high position). For example, the low position described above may be referred to as a first height, and the high position described above may be referred to as a second height higher than the first height. The bolt conveying block 22 includes, as its main configuration, the conveyor 23, first bolt conveying portions 24, second bolt conveying portions 25, first bolt posture control portions 26, second bolt posture control portions 27, a support shaft 28, and an allocation portion 29.

The conveyor 23 is an endless belt conveyor and is provided to be able to circulate between a low position and a high position in the vertical direction. The conveyor 23 illustrated in FIG. 2 is configured to perform a circulation in which, on the side facing the bolt storage portion 202, the conveyor 23 moves from the vicinity of the bolt storage portion 202 located at a relatively low position to the vicinity of the allocation portion 29 located at a relatively high position and then returns again to the vicinity of the bolt storage portion 202 located at the relatively low position.

The first bolt conveying portions 24 and the second bolt conveying portions 25 are engaged with the conveyor 23 and circulate in a predetermined path according to the movement of the conveyor 23. The first bolt conveying portions 24 protrude on an outer surface of a ring formed by the conveyor 23 and each include a magnet for absorbing the bolt 9. The first bolt conveying portion 24 absorbs the bolt 9 in the bolt storage portion 202 and conveys the absorbed bolt 9 to the allocation portion 29.

The second bolt conveying portions 25 are disposed so as to circulate alternately with the first bolt conveying portions 24 on the conveyor 23 and each include magnets each protruding on the outer surface of the ring of the conveyor 23 and in the width direction of the conveyor 23. That is, the second bolt conveying portion 25 passes through the vicinity of the bolt storage portion 202 following the first bolt conveying portion 24 and absorbs the bolts 9. The second bolt conveying portion 25 ascends while absorbing the bolts 9 and brings the absorbed bolts 9 into contact with the first bolt posture control portions 26. When brought into contact with the first bolt posture control portions 26, the bolts 9 absorbed by the second bolt conveying portion 25 separate from the second bolt conveying portion 25 and drop to the bolt storage portion 202.

The first bolt posture control portions 26 and the second bolt posture control portions 27 are configured to protrude in the horizontal direction between the low position and the high position of the plate-like members 220. Details of the first bolt posture control portions 26 and the second bolt posture control portions 27 will be described later.

The support shaft 28 supports the allocation portion 29 in an upper portion of the bolt conveying block 22 to allow the allocation portion 29 to be swingable. The allocation portion 29 swings to drop the bolts 9, absorbed and conveyed by the first bolt conveying portions 24, in both width directions of the conveyor 23 at the high position.

Outline of Bolt Alignment Unit 3

Next, the outline of the bolt alignment unit 3 will be described. The bolt alignment unit 3 includes, as its main configuration, a bolt guide block 30, a position regulating portion 31, path adjusting portions 32, a slide plate 33, bolt stoppers 34, a first tool guide 35, a second tool guide 36, tool placement portions 37, and a cover 38.

The bolt guide block 30 includes, on its upper side, bolt receiving portions 301 for receiving the bolts 9 allocated by the bolt allocation unit 2. The bolt guide block 30 drops the bolts 9, received from the bolt receiving portions 301, according to gravity while controlling the bolts 9 in a predetermined posture, and discharges the bolts 9 from bolt discharge portions 302.

The position regulating portion 31 and the path adjusting portions 32 guide the bolts 9, allocated by the bolt allocation unit 2, to the bolt receiving portions 301 of the bolt guide block 30. The position regulating portion 31 has a shape symmetrical with respect to the YZ-plane passing through the center in the X-axis direction illustrated in FIG. 2 and includes inclined surfaces each lowered in height as away from the center in the X-axis direction. The path adjusting portions 32 guide the bolts 9, forced out by the allocation portion 29, to the bolt receiving portions 301. The path adjusting portions 32 are each formed by, for example, a concave surface approximately perpendicular to the XY-plane.

The slide plate 33 is a plate-like member extending from the bolt guide block 30 to the bolt take-out portion 12 and includes groove portions 331 for guiding the bolts 9. The slide plate 33 has an inclined surface inclined downward as away from the bolt guide block 30. The slide plate 33 includes the bolt take-out portion 12 on its lower side. When the bolts 9 dropped from the bolt guide block 30 are loosely fitted to the groove portions 331, the bolts 9 move downward along the groove portions 331 due to gravity.

The bolt stoppers 34 temporarily stop the bolts 9 discharged from the bolt discharge portions 302 and release the bolts 9 at a predetermined timing. The first tool guide 35, the second tool guide 36, and the tool placement portions 37 serve for positioning the tool 900 illustrated in FIG. 1 when setting the tool 900 in the bolt supply device 1. That is, the user sets the tool 900 to the tool placement portions 37 while placing the tool 900 along the first tool guide 35 and the second tool guide 36. The cover 38 restricts the movement of the bolts 9 in the float-up direction in a predetermined range of the groove portions 331.

Details of Bolt Conveying Block 22

Figure 3:
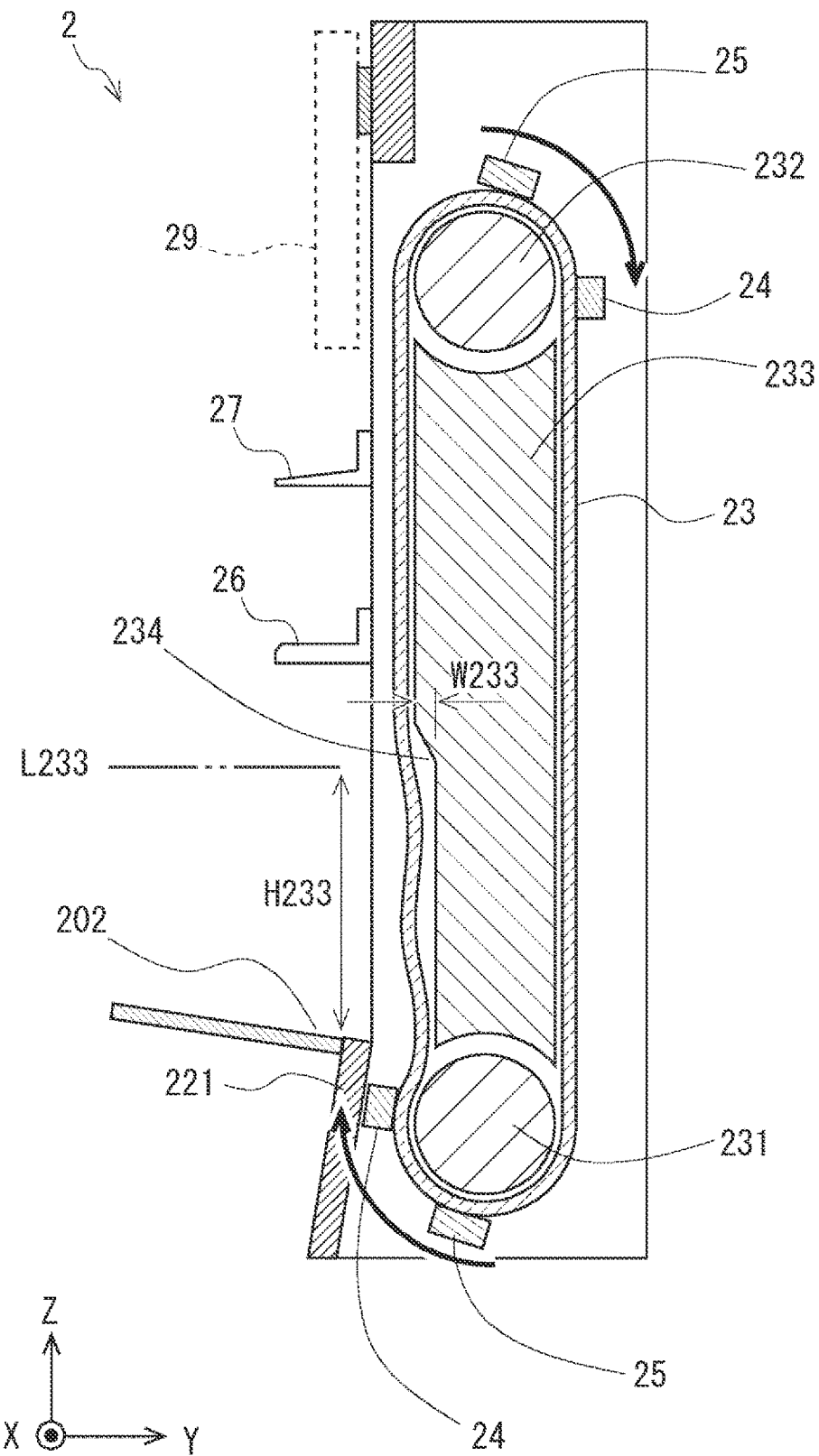
FIG. 3 is a sectional view of a bolt conveying block.

Next, details of the bolt conveying block 22 will be described. FIG. 3 is a sectional view of the bolt conveying block 22. FIG. 3 illustrates a state in which the bolt conveying block 22 is cut along the middle portion of the conveyor 23 in its width direction.

As illustrated in FIG. 3, the conveyor 23 is such that the ring formed by the conveyor 23 has an elliptical shape in which end portions of straight lines extending vertically in parallel to each other are connected to each other by semicircular lines, respectively. That is, the endless belt conveyor 23 is provided to be able to circulate between the low position in the vicinity of the bolt storage portion 202 in the vertical direction and the high position in the vicinity of the allocation portion 29 in the vertical direction.

The conveyor 23 is provided with the first bolt conveying portion 24 and the second bolt conveying portion 25 in a pair at each of opposite positions of the elliptical shape. Since the conveyor 23 is provided with two first bolt conveying portions 24 and two second bolt conveying portions 25, the bolt supply device 1 can shorten the bolt conveying cycle time. The length of the conveyor 23 may be prolonged by increasing the dimension in the up-down direction or the front-rear direction so that the conveyor 23 may be provided with three or more first bolt conveying portions 24 and three or more second bolt conveying portions 25.

Inside the conveyor 23, a first sprocket 231, a second sprocket 232, and a conveyor guide portion 233 are provided for regulating the position of an inner surface of the conveyor 23. The first sprocket 231 is connected to a drive motor (not illustrated) and rotated by the drive motor for circulating the conveyor 23. The first sprocket 231 illustrated in FIG. 3 is rotated clockwise. The second sprocket 232 is rotated by the movement of the conveyor 23. The conveyor guide portion 233 regulates the position of the inner surface of the ring formed by the conveyor 23. With this configuration, the conveyor 23 illustrated in FIG. 3 is configured such that a portion of the conveyor 23 passing through the region of the bolt storage portion 202 on the front side (the Y-axis negative side) continues to move upward from the lower side.

The conveyor guide portion 233 has a cut-out portion 234. The cut-out portion 234 is provided in such a way that a gap is formed between the inner surface of the conveyor 23 and the conveyor guide portion 233 in the region where the bolt storage portion 202 is provided. Specifically, the cut-out portion 234 illustrated in FIG. 3 has a width W233 in the front-rear direction and a height H233 from a lower end of the bolt storage portion 202 toward the upper side in the up-down direction. Herein, at an upper end of the height H233, a bolt storage limit L233 is indicated by a two-dot chain line extending in the front-rear direction. The bolt storage limit L233 represents a position of the limit of the height at which the bolts 9 can be stored. In the cut-out portion 234, the conveyor 23 has a slack that meanders in the range of the width W233 in the front-rear direction.

Figure 4:
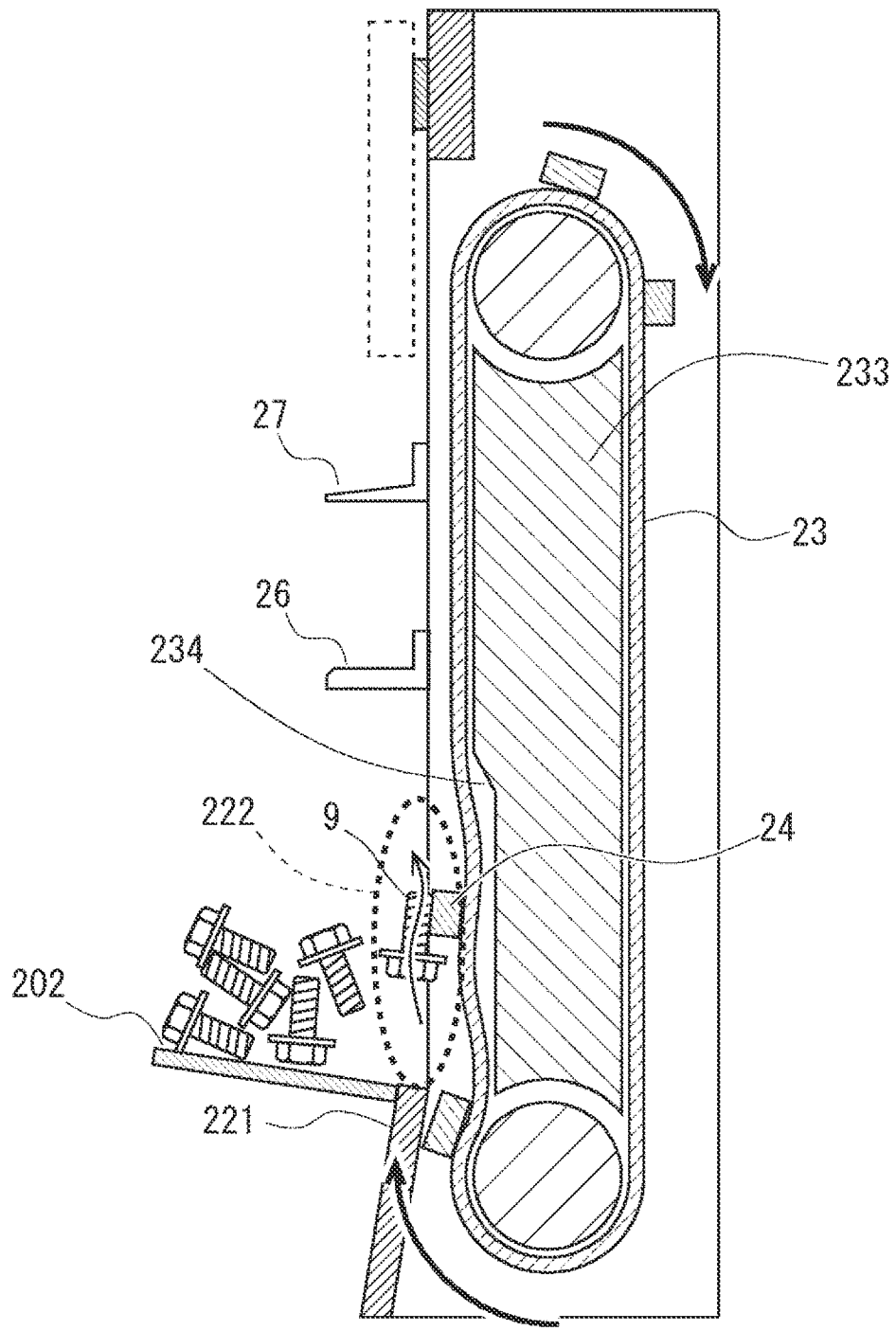
FIG. 4 is a diagram illustrating a state of conveying a bolt in the bolt conveying block.

Next, referring to FIG. 4, a description will be given of an example of a state in which the bolt conveying block 22 conveys the bolt 9. FIG. 4 is a diagram illustrating the state of conveying the bolt 9 in the bolt conveying block 22. The first bolt conveying portion 24 protrudes on the outer surface of the ring of the conveyor 23 and includes the magnet on its protruding surface for absorbing the bolt 9. Consequently, the first bolt conveying portion 24 absorbs the bolt 9 stored in the bolt storage portion 202 and ascends.

In this event, the conveyor 23 meanders in the front-rear direction in the cut-out portion 234. Therefore, the meandering bolt 9 comes in contact with the bolts 9 not absorbed and gives them stimuli such as shock and vibration. Consequently, the bolts 9 piled up in the bolt storage portion 202 move in the direction toward the conveyor 23 due to gravity. That is, by the meandering of the absorbed bolt 9 in a region 222 of the cut-out portion 234, the bolt supply device 1 can suppress a state in which an empty space is formed in the bolt storage portion 202 in the vicinity of the conveyor 23 so that the bolt 9 is not absorbed by the first bolt conveying portion 24.

While the above description is for the first bolt conveying portion 24, the second bolt conveying portion 25 also meanders in the same way. Therefore, also when the second bolt conveying portion 25 ascends in the cut-out portion 234, the bolt supply device 1 can suppress the formation of an empty space in the bolt storage portion 202 in the vicinity of the conveyor 23.

As illustrated in FIGS. 3 and 4, the bolt conveying block 22 includes a conveying portion guide 221 between the bolt storage portion 202 and the first sprocket 231. In the cut-out portion 234, the conveying portion guide 221 guides the first bolt conveying portion 24 and the second bolt conveying portion 25, moving upward from the first sprocket 231, to the inner side of an elliptical shape formed by the conveyor guide portion 233. Consequently, the meandering of the first bolt conveying portion 24 and the second bolt conveying portion 25 is facilitated. Therefore, with the conveying portion guide 221, the bolt supply device 1 can further suppress the formation of an empty space in the bolt storage portion 202 in the vicinity of the conveyor 23.

Figure 5:
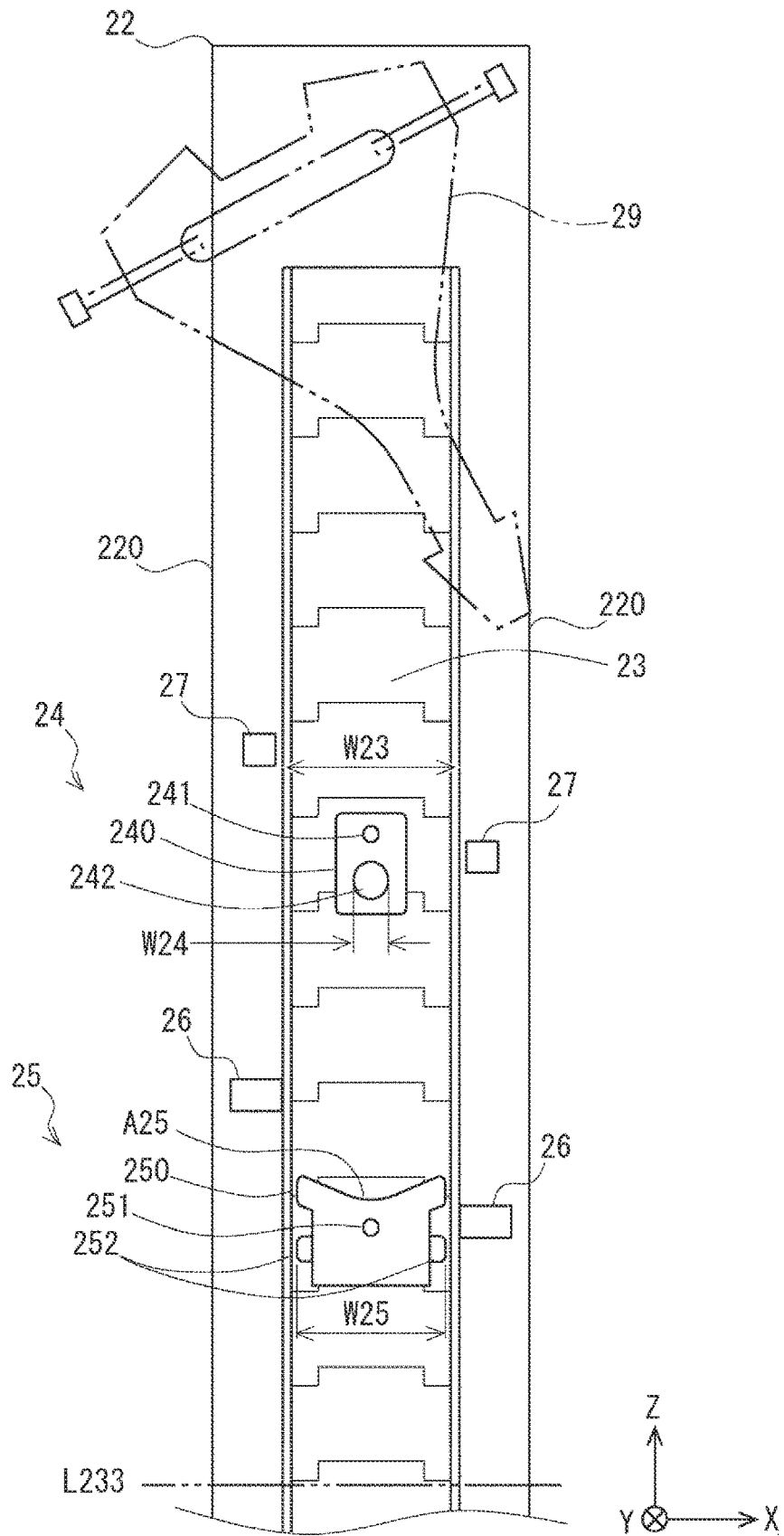
FIG. 5 is a diagram for explaining the configurations of a first bolt conveying portion and a second bolt conveying portion.

Subsequently, the configurations of the first bolt conveying portion 24 and the second bolt conveying portion 25 will be further described. FIG. 5 is a diagram for explaining the configurations of the first bolt conveying portion 24 and the second bolt conveying portion 25. FIG. 5 is a diagram observing the bolt conveying block 22 from the front side.

The first bolt conveying portion 24 includes a body portion 240, a fastening portion 241, and a bolt absorbing portion 242. The body portion 240 is a resin member housing the bolt absorbing portion 242. The fastening portion 241 is a rivet, a fastening pin, a screw, or the like that fixes the body portion 240 to the conveyor 23. The bolt absorbing portion 242 is a magnet having a magnetic force that can absorb and convey the bolt 9. The bolt absorbing portion 242 has a diameter W24. The diameter W24 is smaller than the nominal diameter of a screw of the bolt 9.

In FIG. 5, the second bolt conveying portion 25 is illustrated below the first bolt conveying portion 24. The second bolt conveying portions 25 are disposed so as to circulate alternately with the first bolt conveying portions 24 on the conveyor 23. The second bolt conveying portion 25 includes a body portion 250, a fastening portion 251, and drop bolt absorbing portions 252.

The body portion 250 has a shape in which right and left surfaces of a lower portion are cut out inward. A width W25 of an upper portion of the body portion 250 is smaller than a width W23 of the conveyor 23 and greater than the width of the body portion 240 of the first bolt conveying portion 24. Further, an upper surface A25 of the body portion 250 is concavely curved. The drop bolt absorbing portions 252 respectively protrude in the width direction on the right and left cut-out surfaces of the body portion 250. The amount of the protrusion of the drop bolt absorbing portion 252 is smaller than the cut-out amount of the cut-out surface of the body portion 250.

The fastening portion 251 is a rivet, a fastening pin, a screw, or the like that fixes the body portion 250 to the conveyor 23. The drop bolt absorbing portion 252 is a magnet having a magnetic force that can absorb the bolt 9 in the width direction of the conveyor 23 and convey the absorbed bolt 9. The drop bolt absorbing portions 252 are respectively disposed on the right and left cut-out surfaces of the body portion 250. Consequently, the drop bolt absorbing portions 252 each absorb the bolt 9 on the outer surface of the ring of the conveyor 23 and in the width direction of the conveyor 23.

In FIG. 5, the first bolt posture control portions 26 and the second bolt posture control portions 27 are illustrated between the bolt storage limit L233 and the allocation portion 29. The first bolt posture control portions 26 are disposed below the second bolt posture control portions 27. The first bolt posture control portions 26 are respectively disposed adjacent to the conveyor 23 on both sides of the conveyor 23 in its width direction and respectively protrude forward from the plate-like members 220. However, the first bolt posture control portions 26 are disposed at different heights. That is, in FIG. 5, the height of the first bolt posture control portion 26 disposed on the right side is lower than the height of the first bolt posture control portion 26 disposed on the left side.

In FIG. 5, the second bolt posture control portions 27 are respectively disposed above the first bolt posture control portions 26. Like the first bolt posture control portions 26, the second bolt posture control portions 27 are respectively disposed adjacent to the conveyor 23 on both sides of the conveyor 23 in its width direction and respectively protrude forward from the plate-like members 220. Further, the second bolt posture control portions 27 are disposed at different heights. In FIG. 5, the height of the second bolt posture control portion 27 disposed on the right side is lower than the height of the second bolt posture control portion 27 disposed on the left side. In this embodiment, the first bolt posture control portion 26 and the second bolt posture control portion 27 may simply be referred to as "bolt posture control portions". In this case, the bolt posture control portion may represent the first bolt posture control portion 26, may represent the second bolt posture control portion 27, or may represent either of them.

Figure 6:
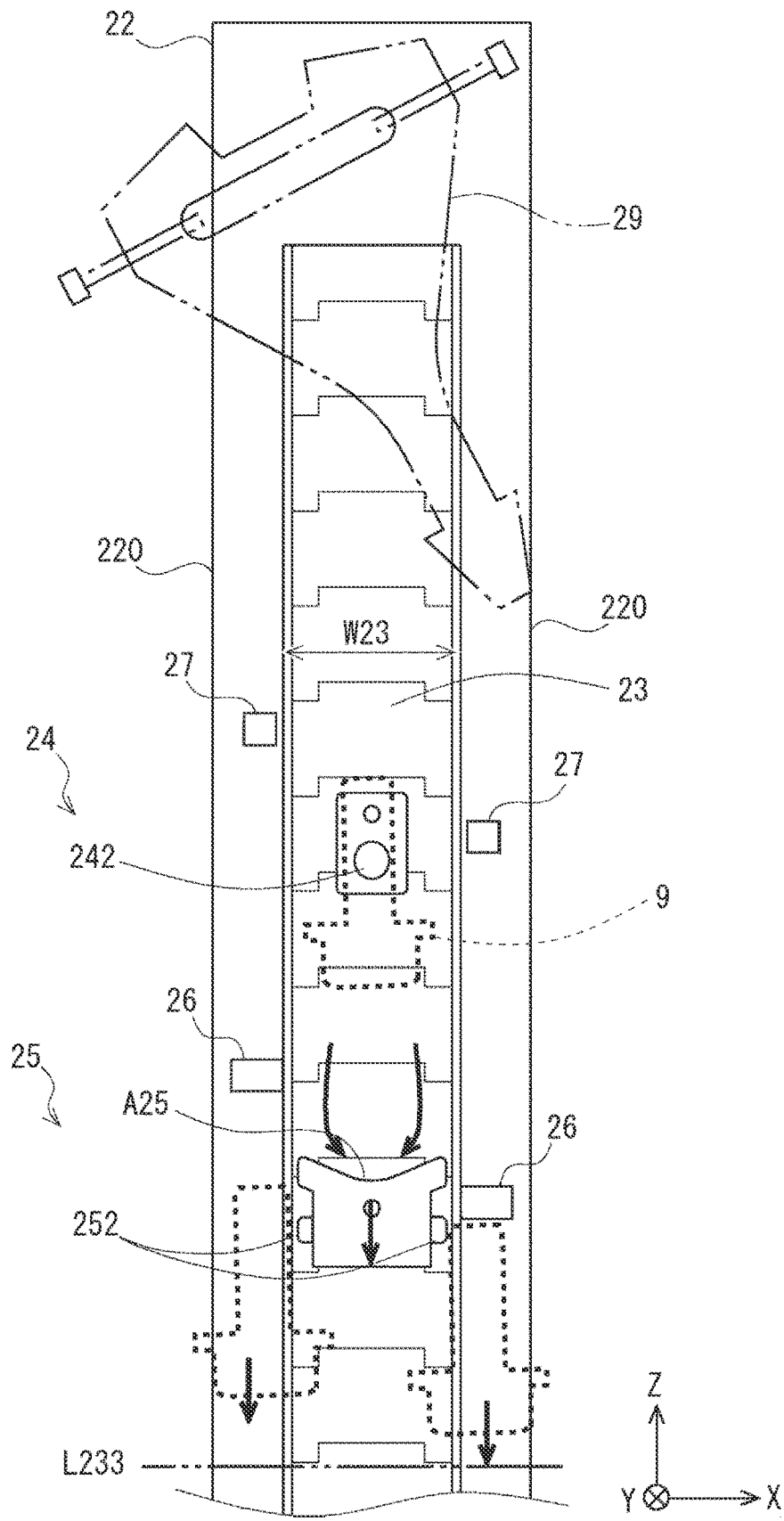
FIG. 6 is a diagram illustrating an example of a state in which bolts are respectively absorbed by the first bolt conveying portion and the second bolt conveying portion.

Next, referring to FIG. 6, the behaviors of the bolts 9 that are respectively absorbed by the first bolt conveying portion 24 and the second bolt conveying portion 25 will be described. FIG. 6 is a diagram illustrating an example of a state in which the bolts 9 are respectively absorbed by the first bolt conveying portion 24 and the second bolt conveying portion 25. In FIG. 6, the bolts 9 that are in the state of being respectively absorbed by the first bolt conveying portion 24 and the second bolt conveying portion 25 are illustrated by dotted lines.

The diameter W24 of the bolt absorbing portion 242 of the first bolt conveying portion 24 is smaller than the nominal diameter of the bolt 9. Therefore, the first bolt conveying portion 24 can suitably absorb the single bolt 9 as illustrated in FIG. 6. Other than the example illustrated in FIG. 6, the bolt absorbing portion 242 may absorb a front end portion or a head portion of the bolt 9 so that the bolt 9 takes a posture of extending in the front-rear direction.

There is a possibility that, for example, the two bolts 9 are absorbed by the bolt absorbing portion 242 so as to be side by side in the right-left direction. In such a case, an absorption force applied to each of the bolts 9 is relatively weak. Therefore, one of the two bolts 9 tends to fall off during the meandering of the first bolt conveying portion 24 in the front-rear direction as illustrated in FIG. 4. The fallen-off bolt 9 drops to the bolts 9 stored in the bolt storage portion 202.

Specifically, the bolt 9 fallen off the first bolt conveying portion 24 hits on the upper surface A25 of the second bolt conveying portion 25 moving below the first bolt conveying portion 24. In this event, the bolt 9 is guided to drop to the central portion of the conveyor 23 in the right-left direction according to the concave shape of the upper surface A25. Since the fallen-off bolt 9 drops to the central portion of the conveyor 23 in the right-left direction in this way, the bolt supply device 1 can suppress the formation of an empty space in the bolt storage portion 202 in the vicinity of the conveyor 23.

The second bolt conveying portion 25 is configured such that, in the bolt storage portion 202, the drop bolt absorbing portions 252 disposed at two positions on the right and left sides absorb the bolts 9 at positions outside the width of the conveyor 23, respectively. In this event, the two bolts 9 are absorbed and raised upward by the drop bolt absorbing portions 252, respectively. For example, when the stored bolts 9 are piled up outside the width of the conveyor 23, the bolts 9 piled up in this region fall down. Consequently, when an empty space is formed in the stored bolts 9, the empty space is eliminated by the bolts 9 that fell down outside the width of the conveyor 23.

When the second bolt conveying portion 25 ascends, the bolts 9 absorbed by the second bolt conveying portion 25 respectively come in contact with the first bolt posture control portions 26 to separate from and fall off the drop bolt absorbing portions 252. Herein, for example, when the stored bolts 9 are piled up in a place where the bolts 9 fallen off the drop bolt absorbing portions 252 dropped, the bolts 9 piled up in this region fall down. Therefore, even when an empty space is temporarily formed in the bolt storage portion 202 in the vicinity of the conveyor 23, the empty space is eliminated by the dropped bolts 9. By the falling-off of the bolts 9 from the second bolt conveying portion 25 in this way, the bolt supply device 1 can suppress the formation of an empty space in the bolt storage portion 202 in the vicinity of the conveyor 23.

Figure 7:
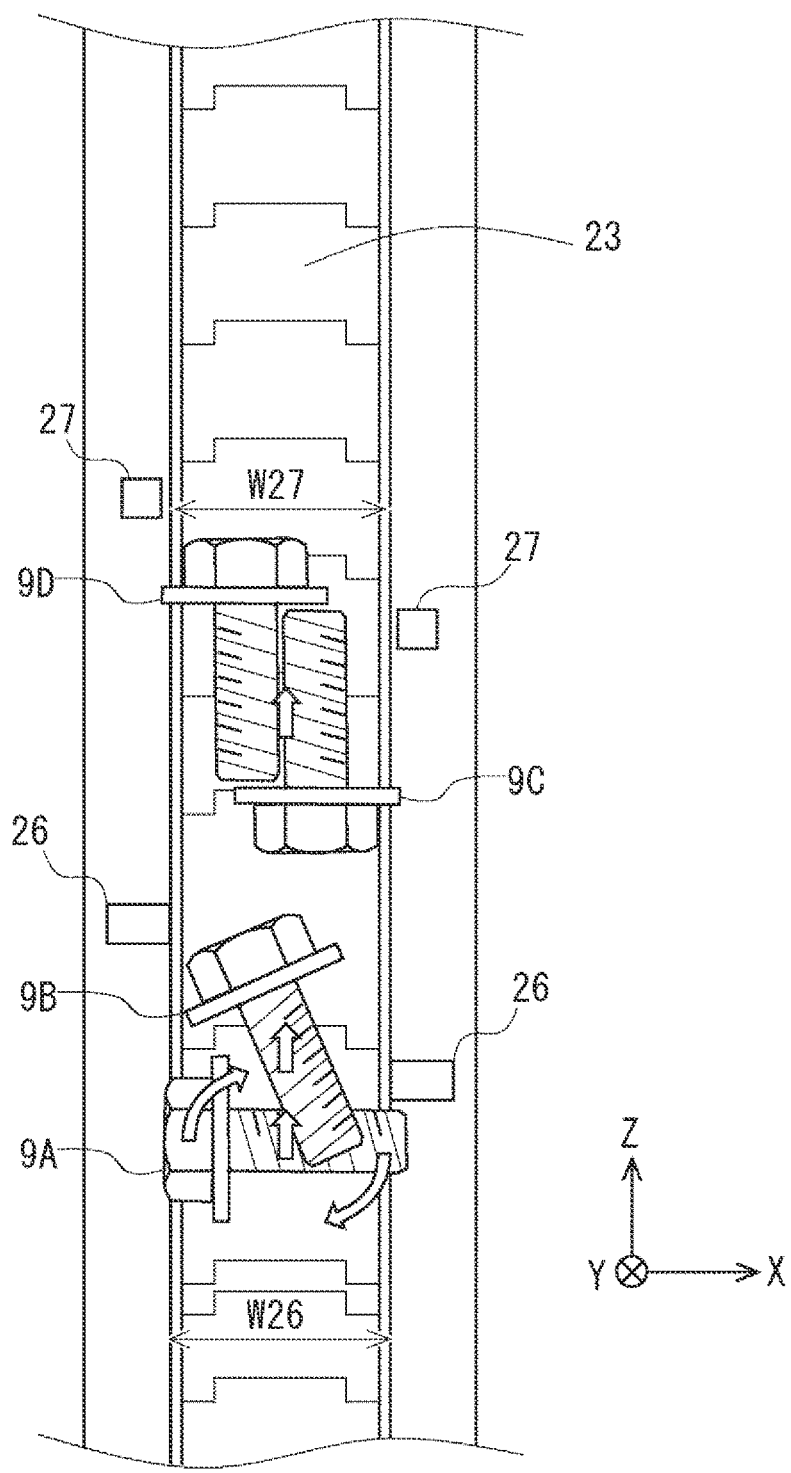
FIG. 7 is a diagram illustrating the arrangement of first and second bolt posture control portions.

Next, referring to FIG. 7, the roles of the first bolt posture control portions 26 and the second bolt posture control portions 27 will be further described. FIG. 7 is a diagram illustrating the arrangement of the first bolt posture control portions 26 and the second bolt posture control portions 27. In FIG. 7, the bolt 9A and the bolt 9B for exemplifying the behavior of the bolt 9 are illustrated in the vicinity of the first bolt posture control portion 26 located on the lower side.

The inner dimension between the first bolt posture control portions 26 disposed on the right and left sides is a width W26. The width W26 is smaller than the full length of the bolt 9. Therefore, when the first bolt conveying portion 24 ascends while absorbing the bolt 9 sideways, for example, as the bolt 9A illustrated in FIG. 7, the bolt 9 comes in contact with the first bolt posture control portion 26 on the right side and rotates clockwise while being absorbed by the first bolt conveying portion 24. Then, the bolt 9 changes its posture to upright in the range of the width W26 as the bolt 9B and continues to ascend.

Note that when the right and left first bolt posture control portions 26 are disposed at the same height, both the head portion and the front end of the screw portion of the bolt 9A respectively come in contact with the first bolt posture control portions 26. Consequently, in this case, the bolt 9 falls off the first bolt conveying portion 24 without being applied with a force in the rotation direction. In the case where the bolt 9 falls off the first bolt conveying portion 24, the bolt supply device 1 cannot supply the bolt 9. Therefore, in order to suppress the dropping of the bolt 9 absorbed sideways as illustrated in FIG. 7, the two first bolt posture control portions 26 are disposed at different heights.

In FIG. 7, the bolt 9C and the bolt 9D are illustrated in the vicinity of the second bolt posture control portions 27, wherein the bolt 9C and the bolt 9D are in postures facing in opposite directions with their screw portions being adjacent to each other. In this state, an inner width W27 between the second bolt posture control portions 27 is set to be smaller than the total width of the bolt 9C and the bolt 9D. Therefore, when the bolt 9C and the bolt 9D ascend, the bolt 9C and the bolt 9D respectively come in contact with the second bolt posture control portions 27. Herein, the second bolt posture control portions 27 have elasticity. Therefore, the second bolt posture control portions 27 in contact with the bolt 9C and the bolt 9D move the bolt 9C and the bolt 9D while being elastically deformed. Consequently, either one of the bolt 9C and the bolt 9D falls off, and the other one of them corrects its position to the center of the first bolt conveying portion 24 and ascends. Note that the heights of the second bolt posture control portions 27 may be the same or may be different from each other.

The roles of the respective portions when the first bolt conveying portion 24 and the second bolt conveying portion 25 convey the bolts 9 have been described. The first bolt posture control portions 26 and the second bolt posture control portions 27 adjust the posture of the bolt 9 absorbed in the bolt storage portion 202 and conveyed by the first bolt conveying portion 24, and drop the bolts 9 absorbed in the bolt storage portion 202 and conveyed by the second bolt conveying portion 25. With this configuration, the bolt supply device 1 allows the first bolt conveying portion 24 to convey the single bolt 9 to the allocation portion 29, and suppresses the formation of an empty space in the bolt storage portion 202. Consequently, the bolt supply device 1 efficiently conveys the bolts 9, is small in size, and suppresses the vibration and noise.

Bolt Allocation Portion 29

Figure 8:
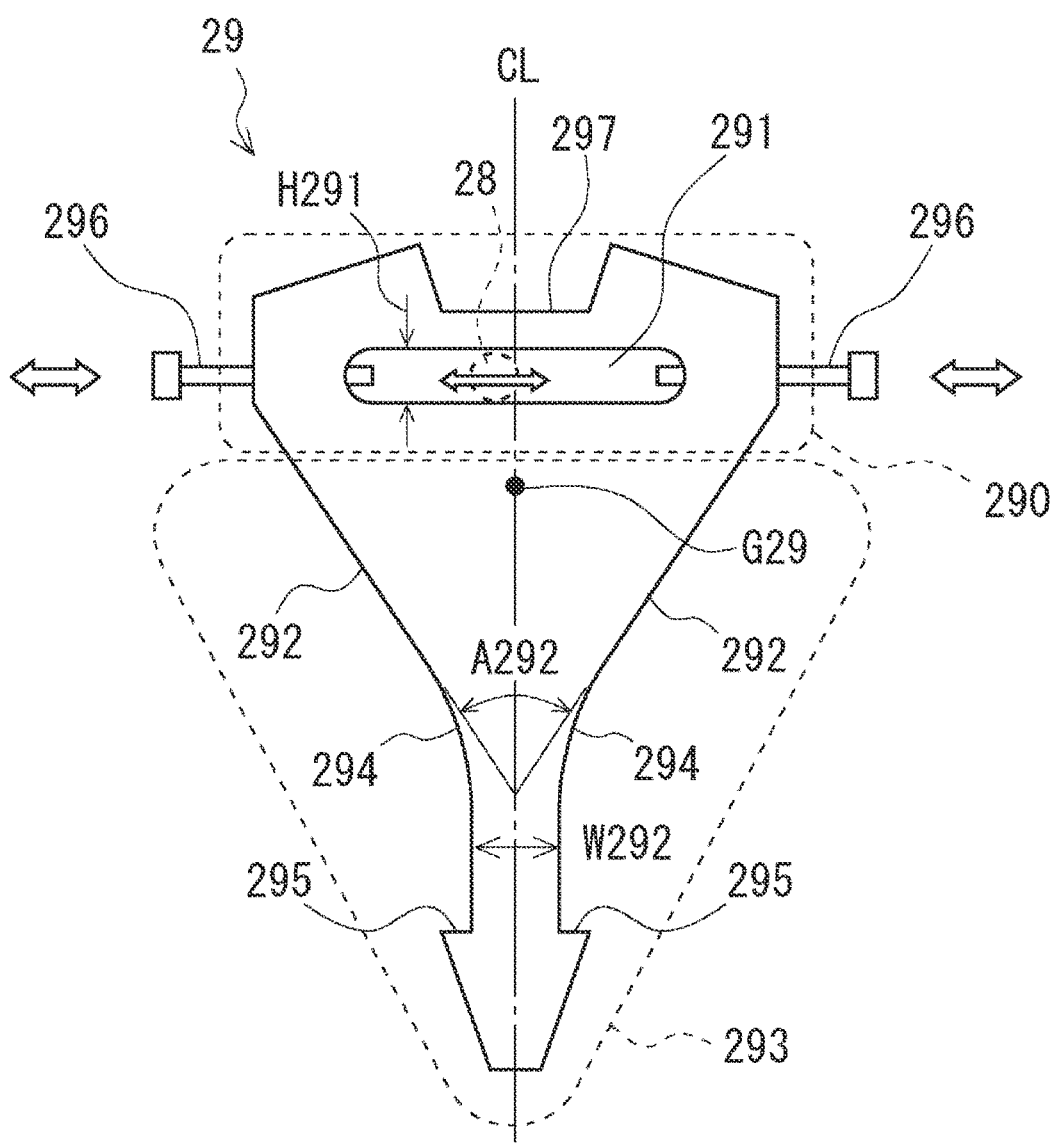
FIG. 8 is a front view of an allocation portion.

Next, the allocation portion 29 will be described. The allocation portion 29 swings to drop the bolts 9, conveyed from the bolt storage portion 202, in both width directions of the conveyor 23 at the high position. FIG. 8 is a front view of the allocation portion 29.

The allocation portion 29 illustrated in FIG. 8 includes a base portion 290 on its upper side and a triangular plate-like protruding portion 293 protruding downward from the base portion 290 and having two bolt contact surfaces 292 in its width direction. The base portion 290 is provided with a hole portion 291. The hole portion 291 is an elongated hole extending in the right-left direction along the base portion 290. A height H291 of the hole portion 291 is set so that the support shaft 28 is slidably engaged with the hole portion 291. By the engagement of the support shaft 28 with the hole portion 291, the protruding portion 293 is swingably suspended below the support shaft 28 so that the bolt contact surface 292 comes in contact with the bolt 9 and swings to drop the bolt 9. The dimension of the allocation portion 29 in its thickness direction is equivalent to the diameter of the head portion of the bolt 9.

The allocation portion 29 includes, in the protruding portion 293, a portion that becomes narrower as away from the base portion 290. After the width of the protruding portion 293 is narrowed as away from the base portion 290, the protruding portion 293 has hook portions 295 extending to spread outward. Further, the allocation portion 29 includes, in the protruding portion 293, an inflection portion 294 in which the reduction rate of the width of the protruding portion 293 is reduced as away from the base portion 290. In other words, in the allocation portion 29, the two bolt contact surfaces 292 approach each other as away from the base portion 290. Further, the allocation portion 29 includes, in the protruding portion 293, the inflection portion 294 in which an angle A292 formed by the two bolt contact surfaces 292 is reduced as away from the base portion 290. In the protruding portion 293, the two bolt contact surfaces 292 describe curved lines in the inflection portion 294 that approach each other as away from the base portion 290 (i.e. as going downward in FIG. 8), and below the curved lines, the two bolt contact surfaces 292 extend in parallel to each other while keeping a width W292. Further, the allocation portion 29 includes, in the protruding portion 293, the hook portions 295 extending away from each other in the spreading direction after the two bolt contact surfaces 292 extend in parallel to each other.

The allocation portion 29 further includes adjustment mechanisms 296 at both end portions of the hole portion 291. The adjustment mechanisms 296 each advance and retreat in the extending direction of the hole portion 291 for adjusting the range in which the support shaft 28 can be engaged with the hole portion 291. The adjustment mechanisms 296 are, for example, screws respectively threaded into both side portions of the allocation portion 29. The allocation portion 29 further includes a recessed portion 297 above the hole portion 291. The recessed portion 297 is used when counting the number of times that the allocation portion 29 swings. The allocation portion 29 has the center of gravity G29 in a region surrounded by both end portions of the hole portion 291 and the protruding portion 293.

Figure 9:
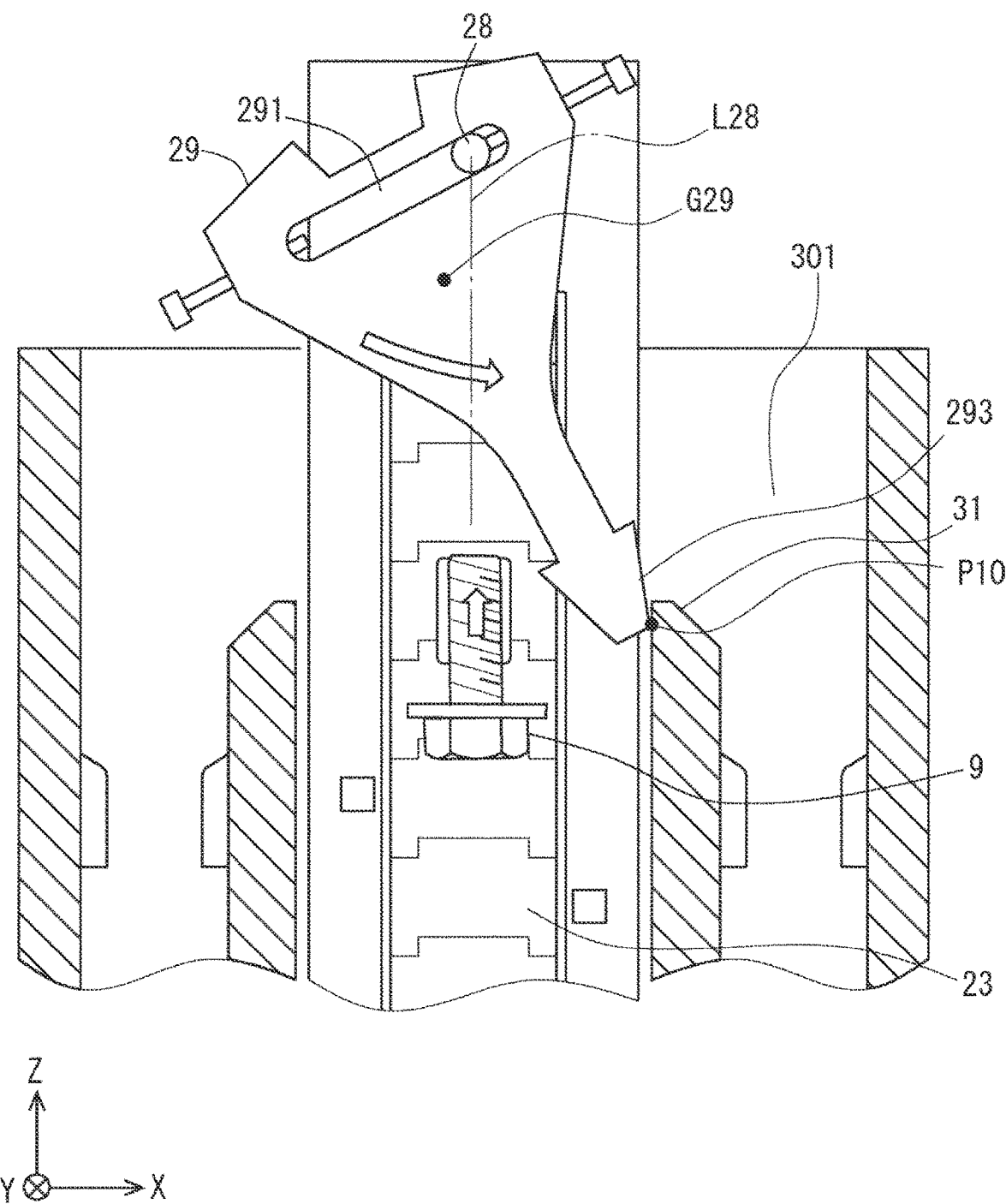
FIG. 9 is a first diagram illustrating an example of the operation of the allocation portion.

Next, the operation of the allocation portion 29 will be described. FIG. 9 is a first diagram illustrating an example of the operation of the allocation portion 29. The allocation portion 29 in FIG. 9 is in a state just before allocating the bolt 9. The bolt 9 is absorbed by the first bolt conveying portion 24 and conveyed upward by the conveyor 23, and approaches the allocation portion 29.

The bolt supply device 1 includes stoppers respectively on the outer sides of the conveyor 23 in its width direction. The stoppers regulate the position of the protruding portion 293. In this embodiment, surfaces of the position regulating portion 31 each facing the conveyor 23 side serve as the stoppers.

In FIG. 9, the allocation portion 29 is engaged with the support shaft 28 and swingably supported by the support shaft 28. The support shaft 28 is slidably engaged with the hole portion 291. In the state illustrated in FIG. 9, the allocation portion 29 is supported on the right side of the hole portion 291. Therefore, due to gravity, the allocation portion 29 is suspended in the direction in which the allocation portion 29 takes a posture with the center of gravity G29 located just below the support shaft 28. On the other hand, the protruding portion 293 comes in contact with the wall surface of the position regulating portion 31 serving as the stopper at a contact point P10. That is, the posture of the allocation portion 29 is regulated by the position regulating portion 31. In this event, the center of gravity G29 is located on the left side of a center line L28 passing through the support shaft 28 and parallel to the Z-axis. In other words, the stopper is disposed so that, in the state where the protruding portion 293 is in contact with the stopper, the support shaft 28 is located between a distal end portion of the protruding portion 293 and the center of gravity G29 of the allocation portion 29 in the width direction of the conveyor 23. Therefore, the allocation portion 29 is applied with a force in the direction in which the allocation portion 29 swings counterclockwise about the support shaft 28, and the position regulating portion 31 serving as the stopper holds the allocation portion 29 at the contact point P10.

Figure 10:
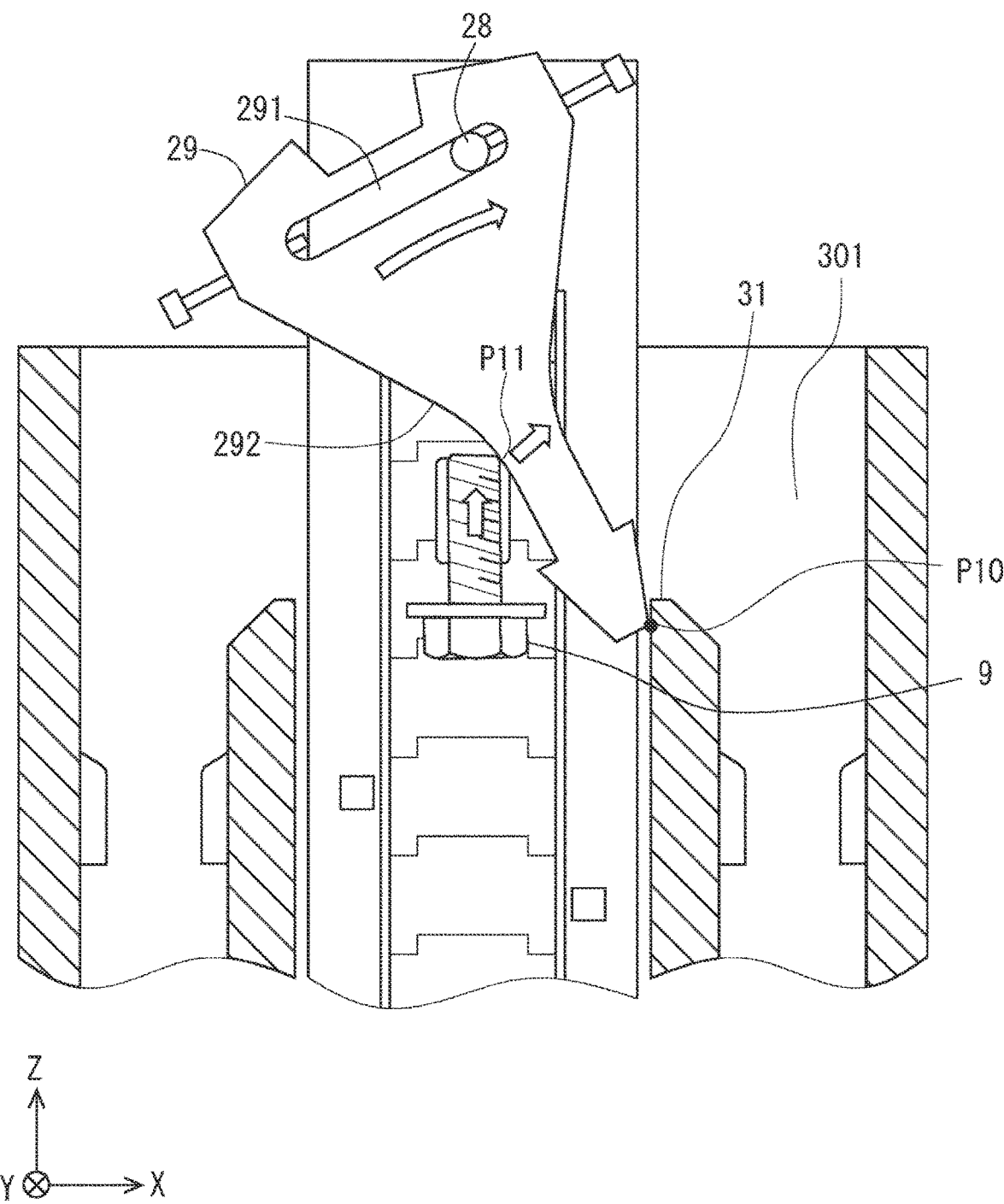
FIG. 10 is a second diagram illustrating an example of the operation of the allocation portion.

FIG. 10 is a second diagram illustrating an example of the operation of the allocation portion 29. FIG. 10 illustrates a state in which, after the state illustrated in FIG. 9, the conveyor 23 further raises the bolt 9 so that the front end of the bolt 9 is in contact with the allocation portion 29. As illustrated in FIG. 10, the bolt 9 is in contact with the allocation portion 29 at a force point P11 on the bolt contact surface 292. Since the bolt 9 continues to ascend while being absorbed by the first bolt conveying portion 24, the bolt 9 applies a pressure in the upper-right direction to the allocation portion 29 at the force point P11. The allocation portion 29 starts to rotate clockwise using the contact point P10 as the fulcrum or the instantaneous center.

Figure 11:
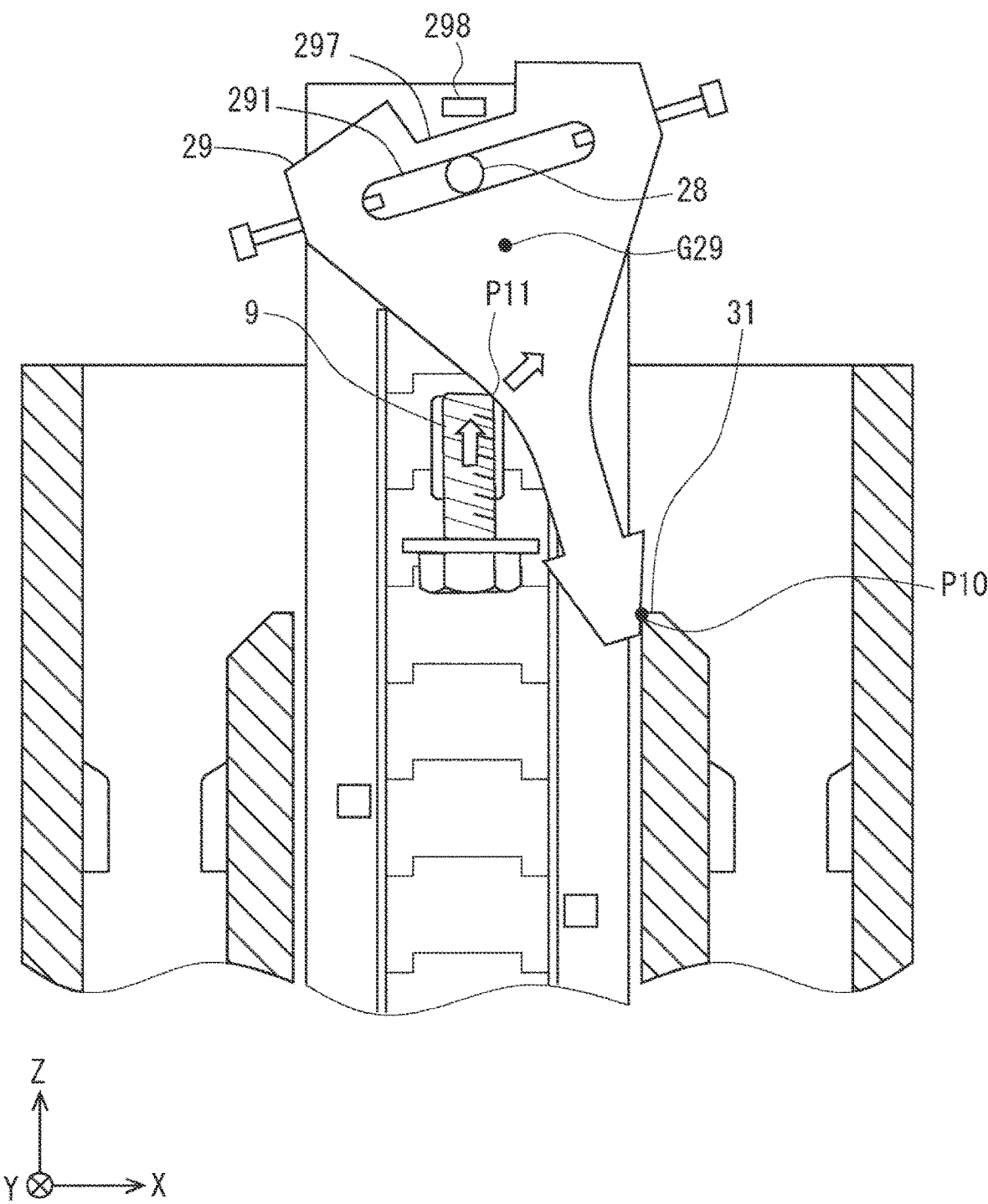
FIG. 11 is a third diagram illustrating an example of the operation of the allocation portion.

FIG. 11 is a third diagram illustrating an example of the operation of the allocation portion 29. FIG. 11 illustrates a state in which the conveyor 23 further raises the bolt 9 after the state illustrated in FIG. 10. As illustrated in FIG. 11, the allocation portion 29 receives the pressure from the bolt 9 at the force point P11 so that the allocation portion 29 is rotating clockwise using the contact point P10 as the fulcrum. Therefore, the allocation portion 29 illustrated in FIG. 11 is engaged with the support shaft 28 on the side of the hole portion 291 slightly leftward from its center. In this event, with the ascending of the bolt 9, the force point P11 relatively moves to the upper side of the allocation portion 29. The shapes of the bolt contact surfaces 292 and the inflection portion 294 are set so that the allocation portion 29 receiving the pressure from the bolt 9 can operate smoothly. The position of the contact point P10 can also be changed with the rotation of the allocation portion 29. In the allocation portion 29, the center of gravity G29 is located in the region surrounded by both end portions of the hole portion 291 being the elongated hole and the protruding portion 293. Therefore, when the bolt 9 applies the pressure to the allocation portion 29 as described above, compared to a case where, for example, the center of gravity is set above the elongated hole, the allocation portion 29 can perform the above-described rotational motion with a relatively small force.

In the state illustrated in FIG. 11, a sensor 298 is illustrated in the vicinity of the recessed portion 297 of the allocation portion 29. The sensor 298 is a reflective optical sensor and is provided at a position so that the detection range of the sensor 298 can detect the passage of the recessed portion 297. In other words, the recessed portion 297 is provided at a position that passes through the sensor 298 when the allocation portion 29 swings. Consequently, with the passage of the recessed portion 297 through the detection range of the sensor 298, a control unit (not illustrated) connected to the sensor 298 controls the driving of the conveyor 23. For example, when the allocation portion 29 has passed through the detection range of the sensor 298 four times, the control unit stops the driving of the conveyor 23.

Figure 12:
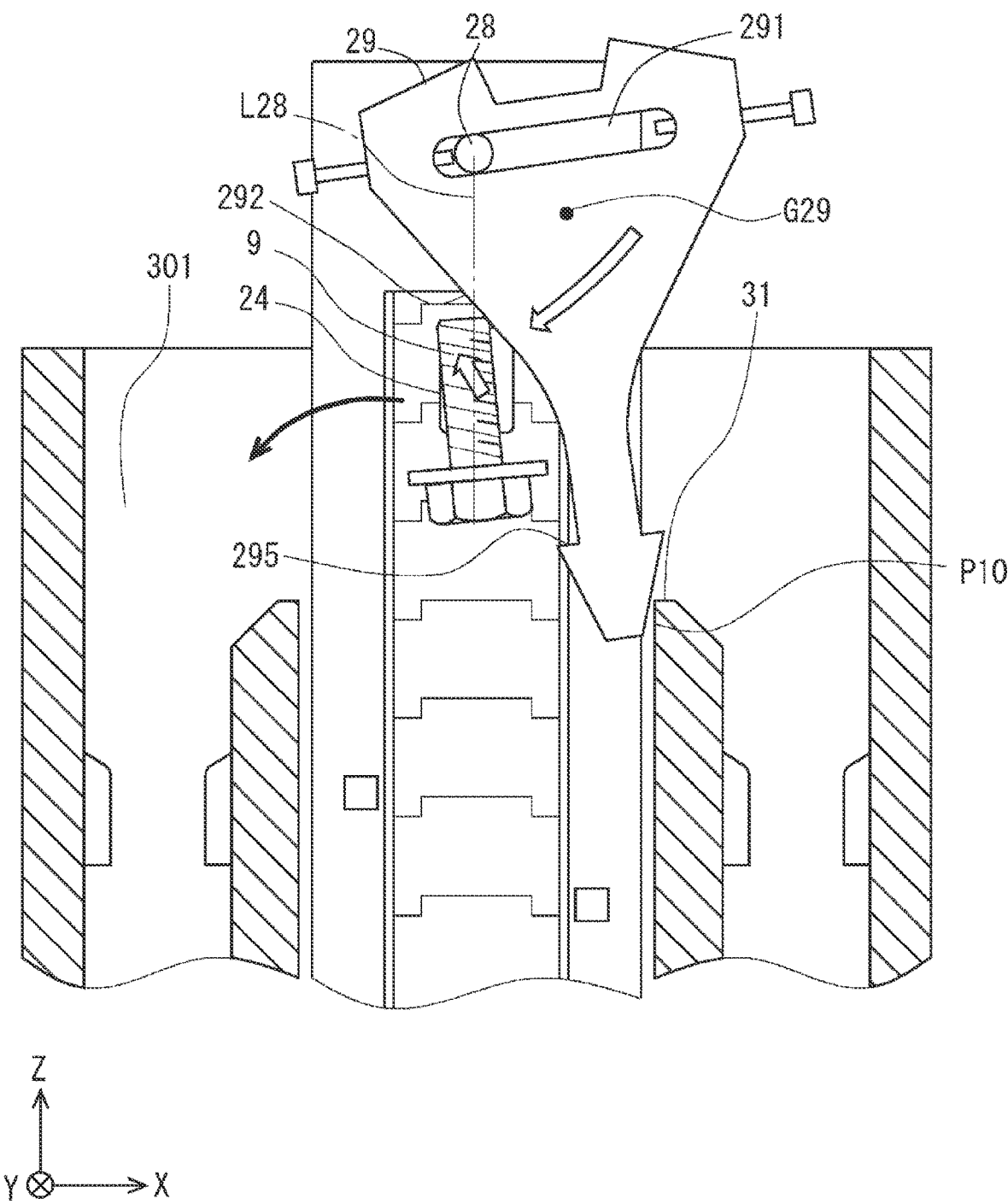
FIG. 12 is a fourth diagram illustrating an example of the operation of the allocation portion.

FIG. 12 is a fourth diagram illustrating an example of the operation of the allocation portion 29. FIG. 12 illustrates a state in which the conveyor 23 further raises the bolt 9 after the state illustrated in FIG. 11. The allocation portion 29 illustrated in FIG. 12 is in a state in which the support shaft 28 has moved to the right end of the hole portion 291. Since the support shaft 28 has moved to the right end of the hole portion 291, the bolt 9 cannot rotate the allocation portion 29 any more. Therefore, the bolt 9 gradually moves to the left side along the bolt contact surface 292. With this, the bolt 9 and the first bolt conveying portion 24 gradually separate from each other.

Further, when there is no pressure from the bolt 9, since the center of gravity G29 is located on the right side of the center line L28, the allocation portion 29 starts a clockwise rotational motion about the support shaft 28 due to gravity. By the clockwise rotational motion of the allocation portion 29, the bolt 9 released from the absorption force of the first bolt conveying portion 24 is forced out to the bolt receiving portions 301 on the left side by the allocation portion 29. In this event, for allowing the bolt 9 to be reliably forced out to the bolt receiving portion 301, the hook portion 295 supports a lower portion of the bolt 9 and guides the bolt 9 to the bolt receiving portion 301.

Figure 13:
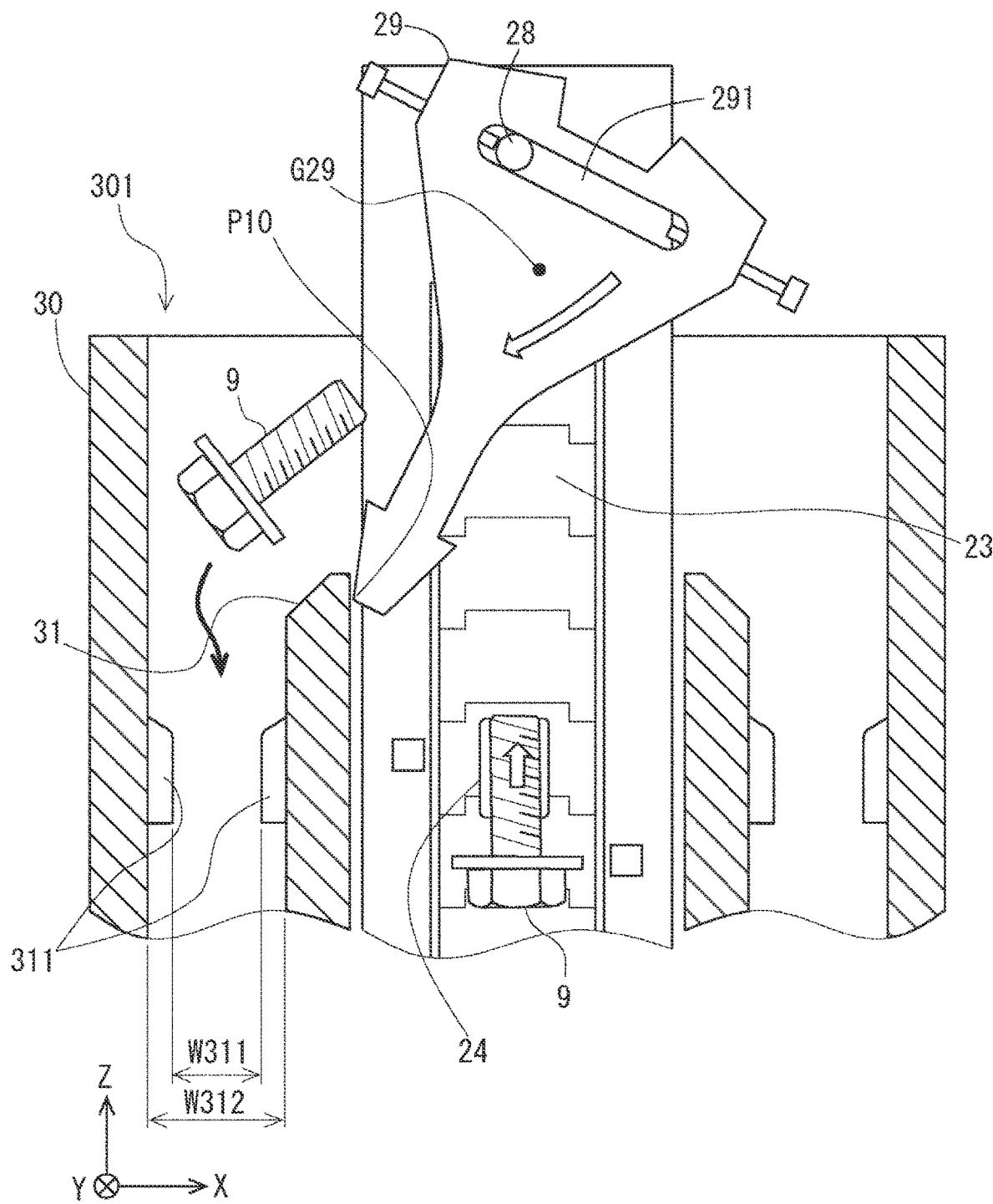
FIG. 13 is a fifth diagram illustrating an example of the operation of the allocation portion.

FIG. 13 is a fifth diagram illustrating an example of the operation of the allocation portion 29. FIG. 13 illustrates a state in which the allocation portion 29 has forced out the bolt 9 after the state illustrated in FIG. 12. The bolt 9 is separated from the first bolt conveying portion 24 and forced out by the allocation portion 29, and is dropping to the bolt receiving portion 301.

The allocation portion 29 illustrated in FIG. 13 is in a posture that is symmetrical with the posture of the allocation portion 29 illustrated in FIG. 9. The first bolt conveying portion 24 conveys the next bolt 9 upward. Therefore, when the next bolt 9 is conveyed to the allocation portion 29, the allocation portion 29 performs a motion with right and left reversed compared to the description given above. In this way, the allocation portion 29 repeats the motions of swinging to the right and left. Consequently, the bolt supply device 1 can supply the bolts 9 alternately to the right and left.

Bolt Guide Block 30

Next, the bolt guide block 30 will be described. The bolt guide block 30 receives the bolts 9 from the bolt receiving portions 301, drops the received bolts 9 according to gravity while controlling the bolts 9 in a predetermined posture, and discharges the bolts 9 from the bolt discharge portions 302.

Figure 14:
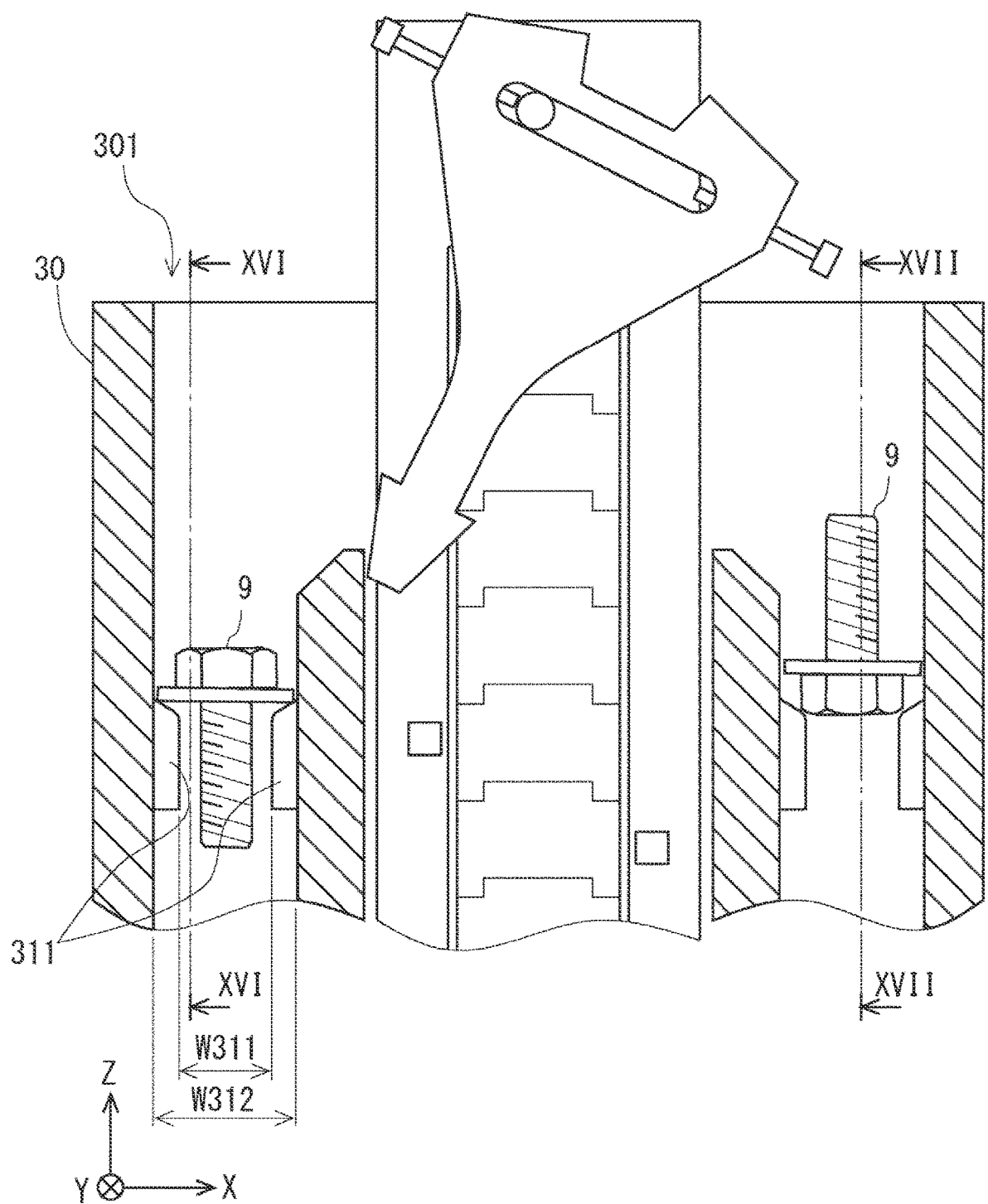
FIG. 14 is a first diagram illustrating the configuration of a bolt guide block.

FIG. 14 is a first diagram illustrating the configuration of the bolt guide block 30. After forced out from the allocation portion 29, the bolt 9 drops to the bolt receiving portion 301 due to gravity. The dropped bolt 9 drops to first guide portions 311. The bolt guide block 30 has a width W312 between wall surfaces so as to regulate the bolt 9 in the right-left direction. The width W312 is slightly greater than the diameter of a flange portion of the bolt 9.

The first guide portions 311 project from the wall surfaces of the bolt guide block 30 to face each other. A gap between the facing first guide portions 311 is a width W311. The width W311 is greater than the screw portion of the bolt 9 and smaller than the head portion of the bolt 9. An upper surface of each of the first guide portions 311 is formed by a smooth inclined surface. Therefore, the first guide portions 311 come in contact with the flange portion or the head portion of the bolt 9 and guide the bolt 9 downward according to gravity.

The bolt 9 illustrated on the left side of FIG. 14 is in a state of dropping to the first guide portions 311 in a posture with the screw portion facing downward. In this case, the first guide portions 311 come in contact with the flange portion and guide the bolt 9 downward. The bolt 9 illustrated on the right side of FIG. 14 is in a state of dropping to the first guide portions 311 in a posture with the head portion facing downward. In this case, the first guide portions 311 come in contact with the head portion and guide the bolt 9 downward. However, in this case, the bolt 9 is in an unstable state so that the bolt 9 rotates to a posture with the screw portion facing downward.

Figure 15:
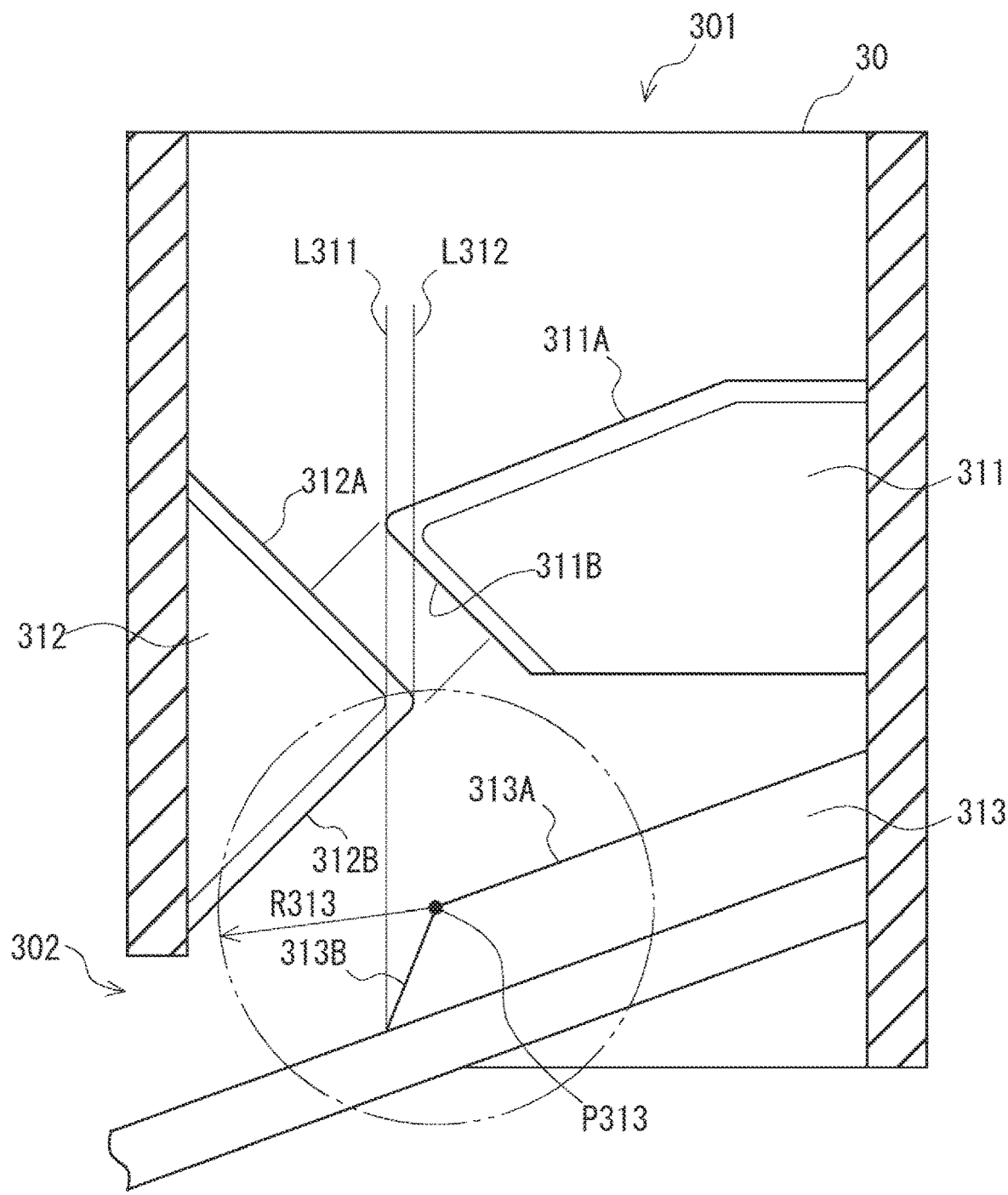
FIG. 15 is a second diagram illustrating the configuration of the bolt guide block.

FIG. 15 is a second diagram illustrating the configuration of the bolt guide block 30. FIG. 15 illustrates a section taken along the line XVI-XVI in FIG. 14. The bolt guide block 30 includes the first guide portions 311, second guide portions 312, and third guide portions 313. Note that as the first guide portions 311 are illustrated as an example in FIG. 14, the first guide portions 311, the second guide portions 312, and the third guide portions 313 are provided symmetrically on the right and left sides so as to guide the right and left of the bolt 9. FIG. 15 illustrates only one side of the guide portions provided symmetrically on the right and left sides.

The first guide portion 311 includes an inclined surface 311A and an inclined surface 311B. The inclined surface 311A receives the bolt 9 dropping to the bolt receiving portion 301 and guides the bolt 9 to the second guide portion 312. The inclined surface 311A is inclined downward from the rear side toward the front side. The inclined surface 311B is disposed in parallel to an inclined surface 312A of the second guide portion 312 and guides the bolt 9 to the third guide portion 313.

The second guide portion 312 includes the inclined surface 312A and an inclined surface 312B. The inclined surface 312A receives the bolt 9 dropping from the first guide portion 311 and guides the bolt 9 to the third guide portion 313. The inclined surface 312A is inclined downward from the front side toward the rear side. The inclined surface 312B is provided to face an inclined surface 313A and an inclined surface 313B of the third guide portion 313 and extend from a lower portion of the inclined surface 312A to the bolt discharge portion 302 so as to guide the screw portion of the bolt 9 dropped to the inclined surface 313A and the inclined surface 313B. The inclined surface 313A receives the bolt 9 dropping from the inclined surface 312A and guides the bolt 9 to the inclined surface 312B. The inclined surface 313A is inclined downward from the rear side toward the front side. The inclined surface 313B guides the bolt 9 from the inclined surface 313A to the bolt discharge portion 302.

The bolt guide block 30 is configured under the following conditions. First, a straight line L311 passing through a point of intersection between the inclined surface 311A and the inclined surface 311B and parallel to the Z-axis is located forward of a straight line L312 passing through a point of intersection between the inclined surface 312A and the inclined surface 312B and parallel to the Z-axis. The straight line L311 passes through a point that approximately coincides with a lower end of the inclined surface 313B. The interval between parallel lines formed by the inclined surface 312A and the inclined surface 311B is set to a degree that allows the flange portion of the bolt 9 to pass through. The length of portions, overlapping each other, of the parallel lines formed by the inclined surface 312A and the inclined surface 311B is greater than the diameter of the flange portion of the bolt 9. A circle with its center at a point of intersection P313 between the inclined surface 313A and the inclined surface 313B and with a radius R313 having a length corresponding to the full length of the bolt 9 is set at a position that is not in contact with a wall surface of the bolt discharge portion 302.

Figure 16:
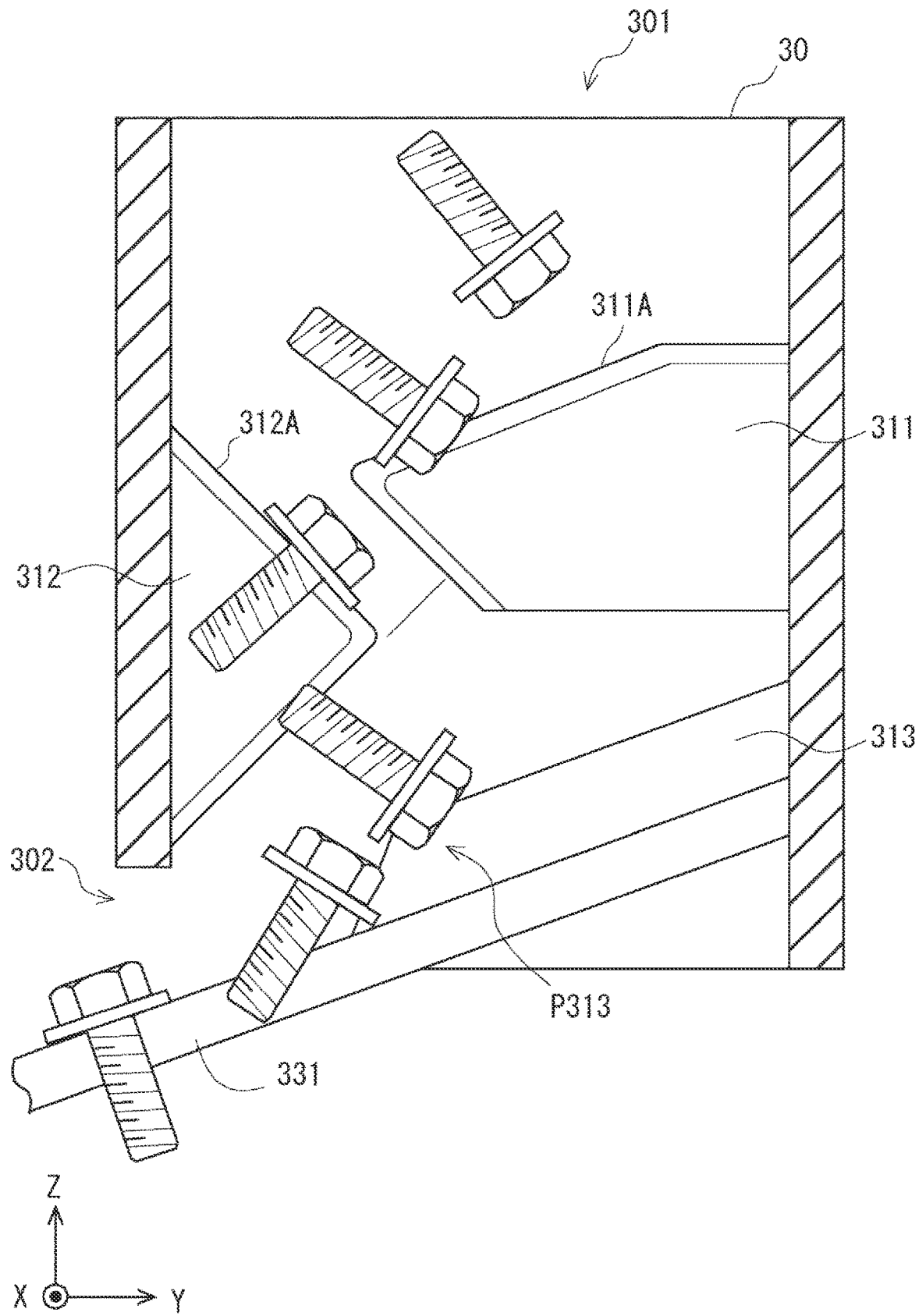
FIG. 16 is a diagram illustrating a first example of the behavior of a bolt in the bolt guide block.

Next, referring to FIG. 16, a description will be given of an example of the behavior of the bolt 9 dropping in the bolt guide block 30. FIG. 16 is a diagram illustrating a first example of the behavior of the bolt 9 in the bolt guide block 30. The bolt 9 illustrated in FIG. 16 drops to the bolt receiving portion 301 in a posture with the head portion facing downward. In this case, the bolt 9 abuts the inclined surface 311A of the first guide portion 311 and drops toward the second guide portion 312 while rotating counterclockwise. While changing the posture so that the screw portion faces downward, the bolt 9 abuts the inclined surface 312A at its flange portion and slides down the inclined surface 312A in that posture. Then, the bolt 9 drops to the third guide portion 313 in a posture with the head portion facing downward. The bolt 9 rotates counterclockwise in the vicinity of the point of intersection P313 between the inclined surface 313A and the inclined surface 313B so that the screw portion enters the groove portion 331 and that the flange portion comes in contact with an inclined surface of the groove portion 331.

Thereafter, the bolt 9 slides down the groove portion 331 in this posture.

Figure 17:
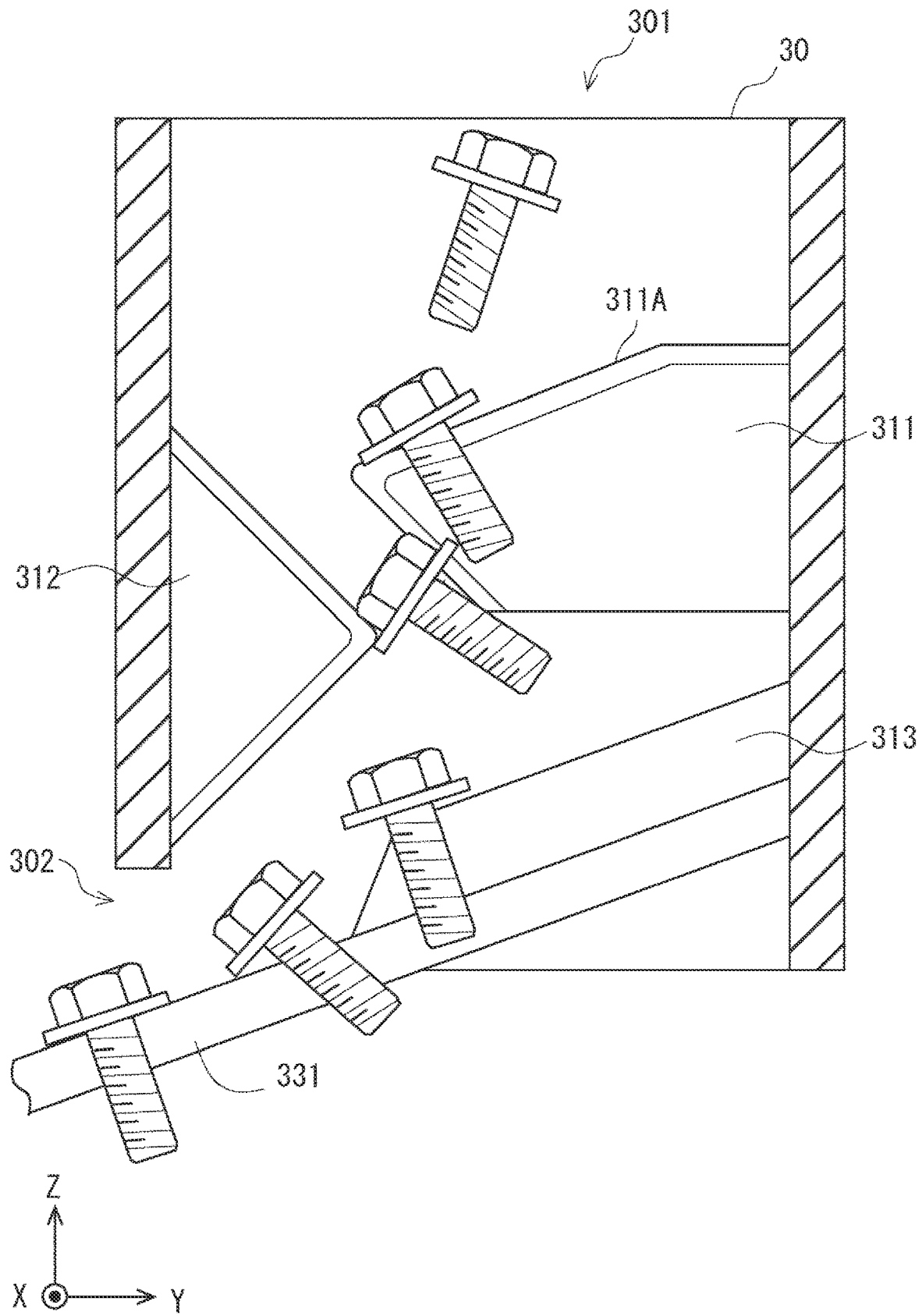
FIG. 17 is a diagram illustrating a second example of the behavior of a bolt in the bolt guide block.

Next, referring to FIG. 17, a description will be given of another example of the behavior of the bolt 9 dropping in the bolt guide block 30. FIG. 17 is a diagram illustrating a second example of the behavior of the bolt 9 in the bolt guide block 30. The bolt 9 illustrated in FIG. 17 drops to the bolt receiving portion 301 in a posture with the screw portion facing downward. In this case, the bolt 9 abuts the inclined surface 311A of the first guide portion 311 at its flange portion and slides down toward the second guide portion 312. Then, the bolt 9 passes through between the first guide portion 311 and the second guide portion 312 and drops to the third guide portion 313 in a posture with the screw portion facing downward. Then, the bolt 9, with the screw portion facing downward, slides down the inclined surface 313A and the inclined surface 313B and subsequently slides down the groove portion 331.

The examples of guiding the bolt 9 by the bolt guide block 30 have been described above, but not limited thereto. The bolt guide block 30 receives the bolts 9 dropping to the bolt receiving portions 301 in various postures not limited to the examples described above, and the bolt guide block 30 finally controls each of the bolts 9 to a posture that allows the screw portion to enter the groove portion 331, and discharges the bolts 9 from the bolt discharge portions 302.

Bolt Stopper 34

Figure 18:
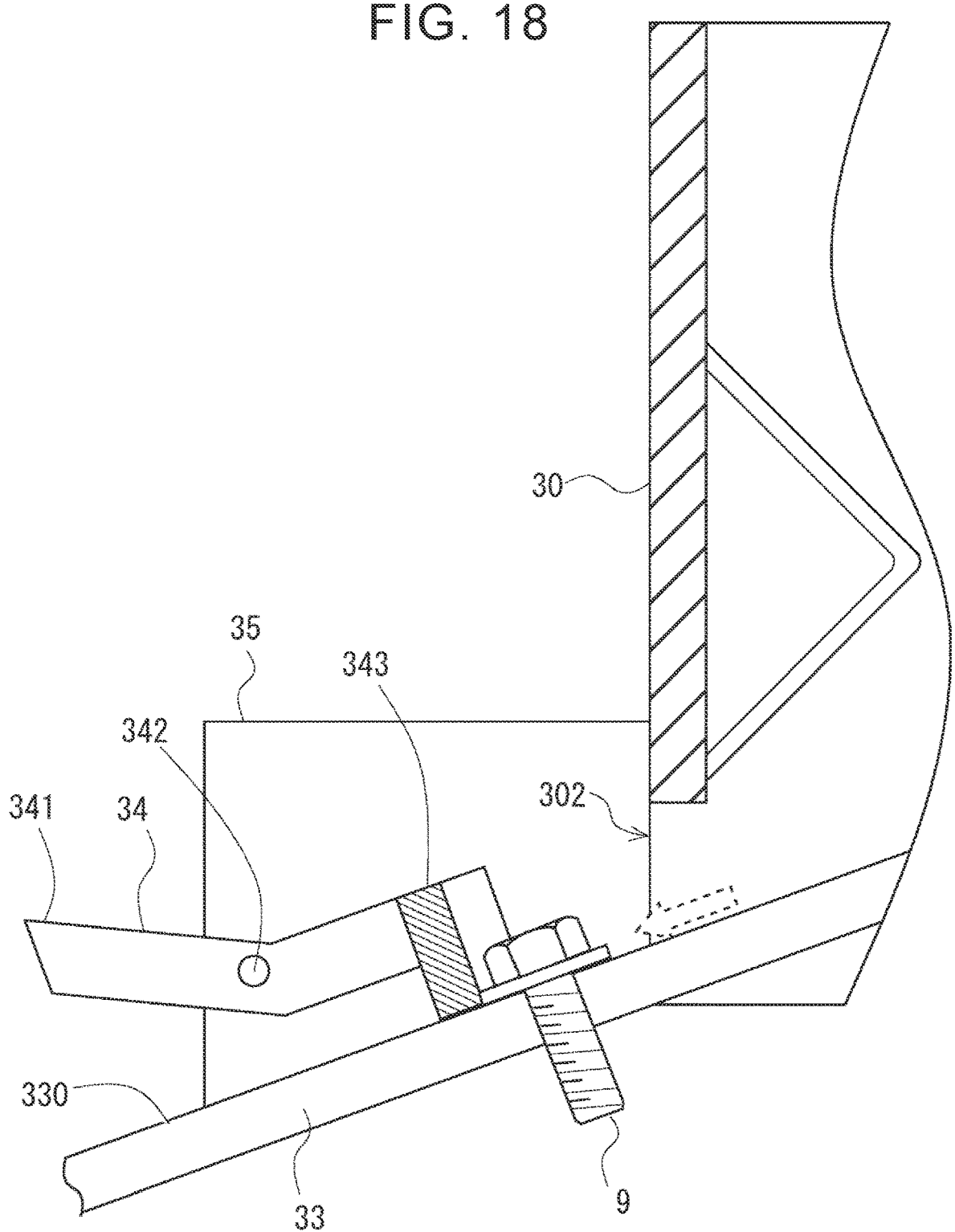
FIG. 18 is a first diagram illustrating the configuration of a bolt stopper.

Next, the bolt stopper 34 will be described. FIG. 18 is a first diagram illustrating the configuration of the bolt stopper 34. The bolt stopper 34 includes a lever portion 341, a fulcrum 342, and a stopper portion 343.

The lever portion 341 is pivoted at the fulcrum 342. The stopper portion 343 is connected to one end of the lever portion 341, and the other end of the lever portion 341 protrudes toward the bolt take-out portion 12. The bolt stopper 34 is configured such that when the side of the lever portion 341 protruding to the bolt take-out portion 12 is pushed down by the tool 900, the stopper portion 343 rises. The stopper portion 343 is provided at a position where the bolt 9 discharged from the bolt discharge portion 302 is received.

Figure 19:
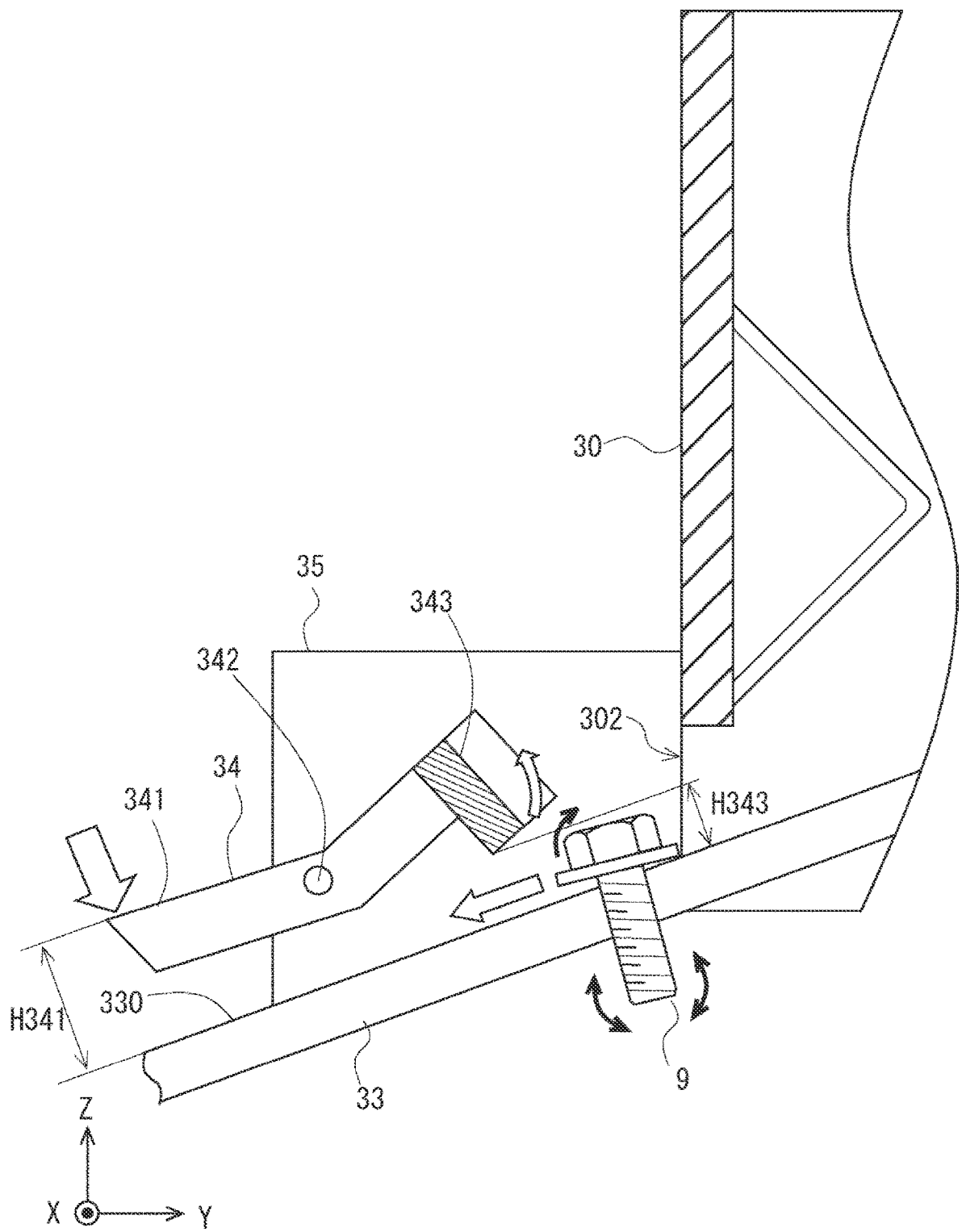
FIG. 19 is a second diagram illustrating the configuration of the bolt stopper.

FIG. 19 is a second diagram illustrating the configuration of the bolt stopper 34. FIG. 19 illustrates a state in which the side of the lever portion 341 protruding toward the bolt take-out portion 12 (i.e. forward or in the Y-axis negative direction) is pushed down by the tool 900. The bolt stopper 34 is set so that when the tool 900 is set in the bolt supply device 1, the height of the side protruding to the bolt take-out portion 12 becomes a height H341 as illustrated in FIG. 19. In this case, the lever portion 341 is pushed down to a position of the height H341 from the slide plate 33.

On the other hand, the stopper portion 343 is raised to a position of a gap H343 from the slide plate 33. The gap H343 is greater than the total thickness of the flange portion and the head portion of the bolt 9. Therefore, the bolt 9 is released from the stopper portion 343 and advances toward the bolt take-out portion 12 of the slide plate 33 with the flange portion sliding downward along an inclined surface 330 of the slide plate 33.

As indicated by arrows in FIG. 19, when the stopper portion 343 rotates counterclockwise, a clockwise rotation force is applied to the head portion of the bolt 9 due to reaction of the counterclockwise rotation of the stopper portion 343. Therefore, a force of rocking about the X-axis is generated on the bolt 9. Consequently, while rocking about the X-axis, the bolt 9 slides down the inclined surface 330 due to gravity.

Bolt Take-Out Portion 12

Figure 20:
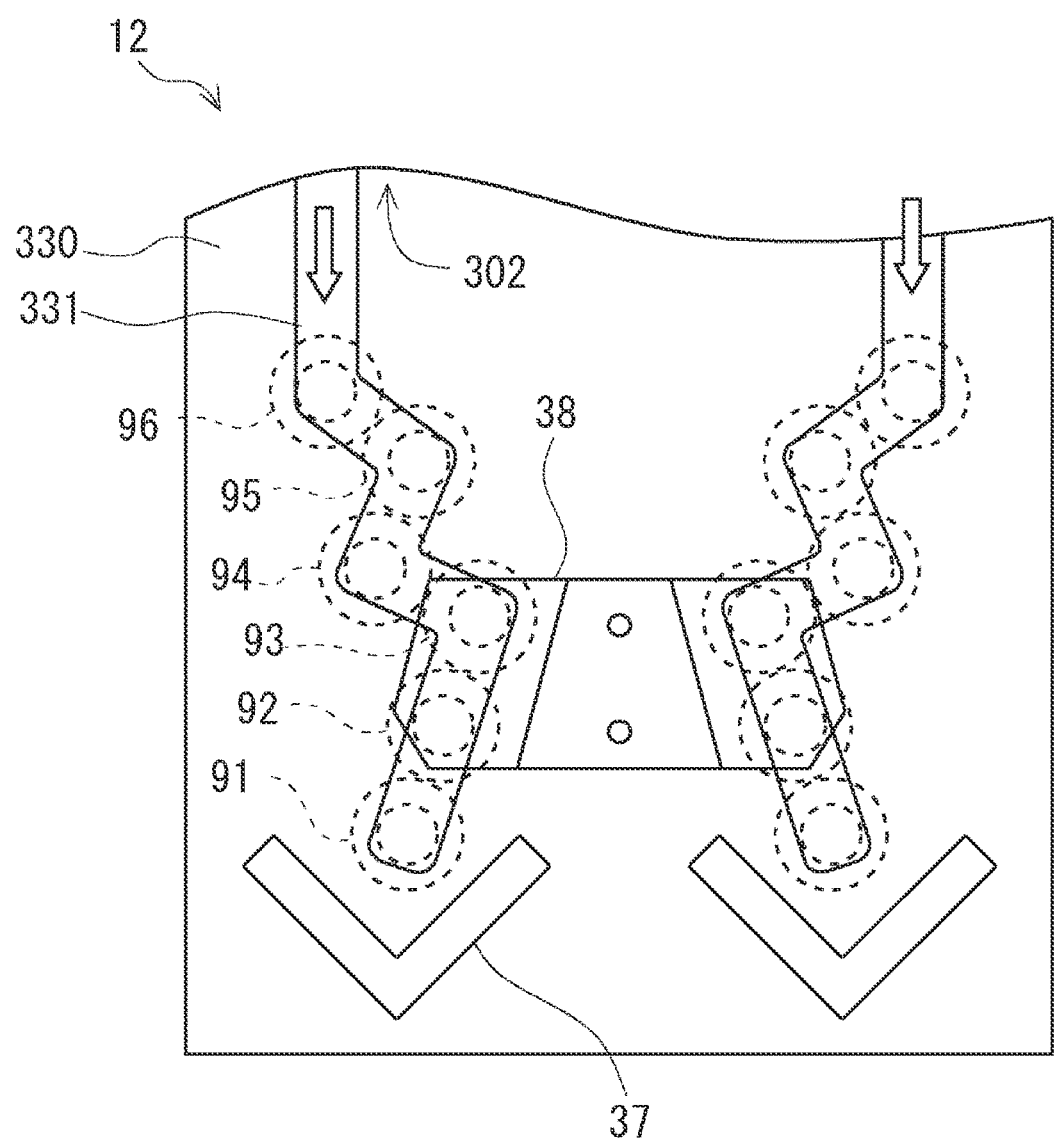
FIG. 20 is a diagram illustrating the configuration of a bolt take-out portion.

Next, the configuration of the bolt take-out portion 12 will be described. FIG. 20 is a diagram illustrating the configuration of the bolt take-out portion 12. FIG. 20 is a diagram observing the inclined surface 330 from above. The bolt take-out portion 12 is configured such that the two groove portions 331 are formed in the inclined surface 330 so as to be symmetrical to each other in the right-left direction. The following description is applied to each of the groove portions 331 formed to be symmetrical to each other in the right-left direction.

The groove portion 331 repeats bending and extends to the lower side of the inclined surface 330. The tool placement portion 37 is provided upright in a lower portion of the inclined surface 330. As a plurality of positions where the bolts 9 respectively stop in the state where the bolts 9 are filled in the bolt take-out portion 12, the groove portion 331 has a first stop position 91 to a sixth stop position 96 from a lower end of the groove portion 331 toward the upper side. The first stop position 91 is a position where the screw portion of the bolt 9 comes in contact with the lower end of the groove portion 331. The second stop position 92 is a position of the bolt 9 that stops due to contact of its flange portion with the flange portion of the bolt 9 that has stopped at the first stop position 91. Likewise, the third stop position 93 is a position of the bolt 9 that stops due to contact of its flange portion with the flange portion of the bolt 9 that has stopped at the second stop position 92, and the fourth stop position 94 to the sixth stop position 96 are set in the same way.

In this embodiment, the bolts 9 that are taken out by the tool 900 are the bolts that stop at the first stop position 91 and the fourth stop position 94. When the bolts 9 are taken out by the tool 900, since there are no bolts 9 at the positions of the taken-out bolts 9, the bolts 9 present above the taken-out bolts 9 slide down the groove portion 331.

In the bolt take-out portion 12, the cover 38 is provided in a region corresponding to the second stop position 92 and the third stop position 93. The cover 38 is parallel to the inclined surface 330 and is fixed at a position that is not in contact with the head portion of the bolt 9. With the cover 38 being provided, the bolt supply device 1 can suppress that the bolts 9 sliding down in the region corresponding to the second stop position 92 and the third stop position 93 float up to ride on the adjacent bolts 9. For allowing the user to observe the state of the bolts 9, the cover 38 is made of a transparent material.

Figure 21:
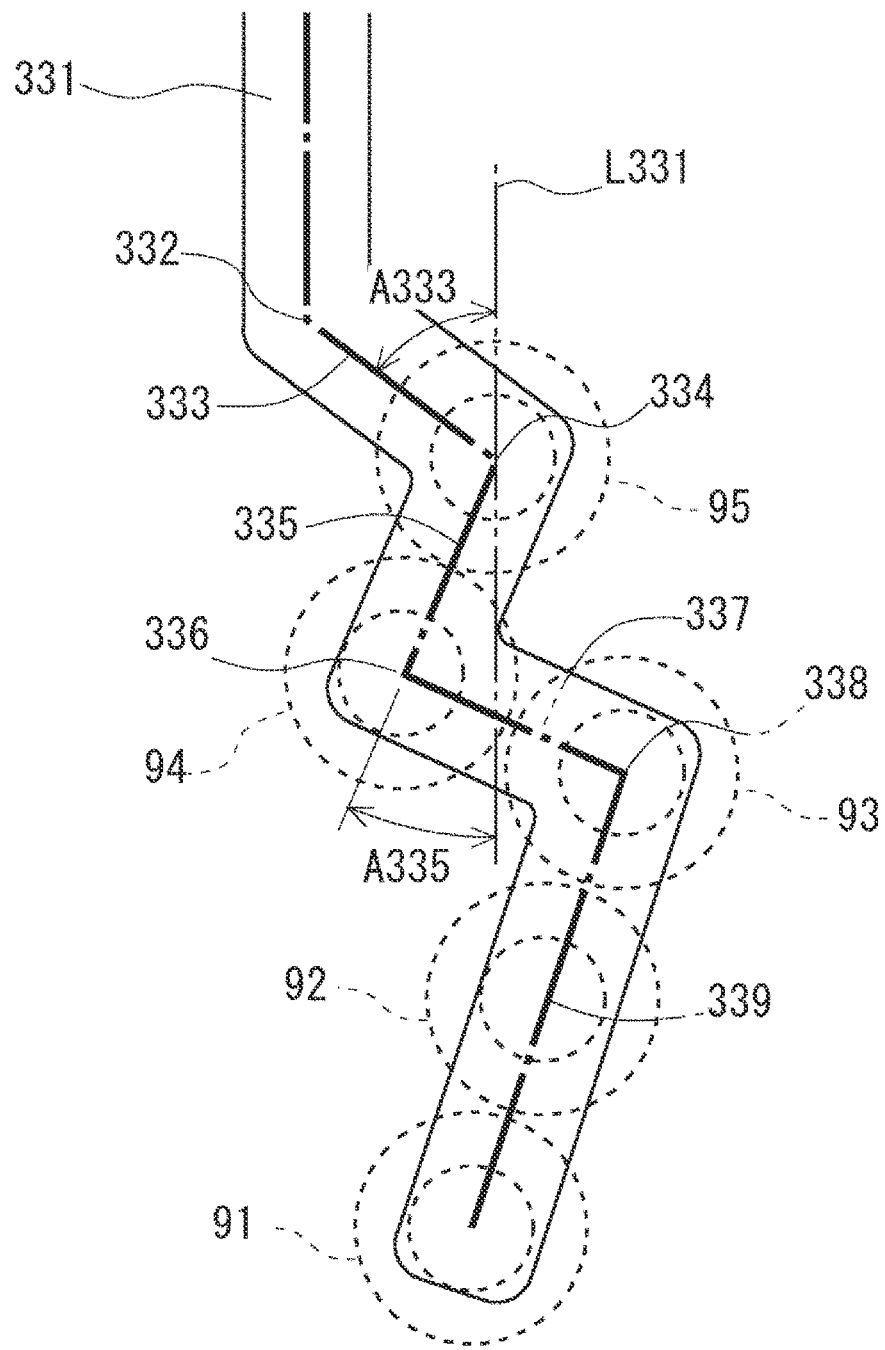
FIG. 21 is a diagram illustrating the shape of a groove portion.

Next, referring to FIG. 21, the shape of the groove portion 331 will be described. FIG. 21 is a diagram illustrating the shape of the groove portion 331. In FIG. 21, the center line is indicated by a thick one-dot chain line along the shape of the groove portion 331. The shape of the groove portion 331 is formed along this center line. The groove portion 331 includes a first connecting portion 332, a first groove 333, a second connecting portion 334, a second groove 335, a third connecting portion 336, a third groove 337, a fourth connecting portion 338, and a fourth groove 339.

The first connecting portion 332 is a bent portion of the groove portion 331 extending downward from the bolt discharge portion 302. The groove portion 331 is bent downward in the first connecting portion 332 at an angle greater than 90 degrees and connected to the first groove 333. The first groove 333 extends obliquely downward from the first connecting portion 332 and is connected to the second groove 335 in the second connecting portion 334. In the second connecting portion 334, the first groove 333 and the second groove 335 are connected to each other at approximately 90 degrees. The second connecting portion 334 is set at the fifth stop position 95. In this embodiment, approximately 90 degrees includes from about 80 degrees to about 100 degrees.

The second groove 335 extends obliquely downward from the second connecting portion 334 and is connected to the third groove 337 in the third connecting portion 336. The second groove 335 is set to a length so that, in the state where the bolts 9 are filled in the bolt take-out portion 12, the center of the bolt 9 is disposed in the second connecting portion 334 connected to the first groove 333. Further, the second groove 335 is set so that the two bolts 9 are aligned therein.

The third connecting portion 336 is set at the fourth stop position 94. In the third connecting portion 336, the second groove 335 and the third groove 337 are connected to each other at approximately 90 degrees.

The third groove 337 extends obliquely downward from the third connecting portion 336 and is connected to the fourth groove 339 in the fourth connecting portion 338. The third groove 337 is set to a length so that, in the state where the bolts 9 are filled in the bolt take-out portion 12, the center of the bolt 9 is disposed in the third connecting portion 336 connected to the second groove 335. Further, the third groove 337 is set so that the two bolts 9 are aligned therein.

The fourth connecting portion 338 is set at the third stop position 93. In the fourth connecting portion 338, the third groove 337 and the fourth groove 339 are connected to each other at approximately 90 degrees.

The fourth groove 339 extends obliquely downward from the fourth connecting portion 338. The lower end of the fourth groove 339 is set at the first stop position 91. The fourth groove 339 is set to a length so that, in the state where the bolts 9 are filled in the bolt take-out portion 12, the center of the bolt 9 is disposed in the fourth connecting portion 338 connected to the third groove 337. Further, the fourth groove 339 is set so that the three bolts 9 are aligned therein.

In FIG. 21, a line L331 crossing the second connecting portion 334 and extending in the up-down direction along the slide plate 33 is indicated. Herein, the angle formed between the first groove 333 and the line L331 is a first angle A333. Further, the angle formed between the second groove 335 and the line L331 is a second angle A335 smaller than the first angle A333. Consequently, the speed of the bolt 9 sliding down the first groove 333 is lower than the speed of the bolt 9 sliding down the second groove 335.

Figure 22:
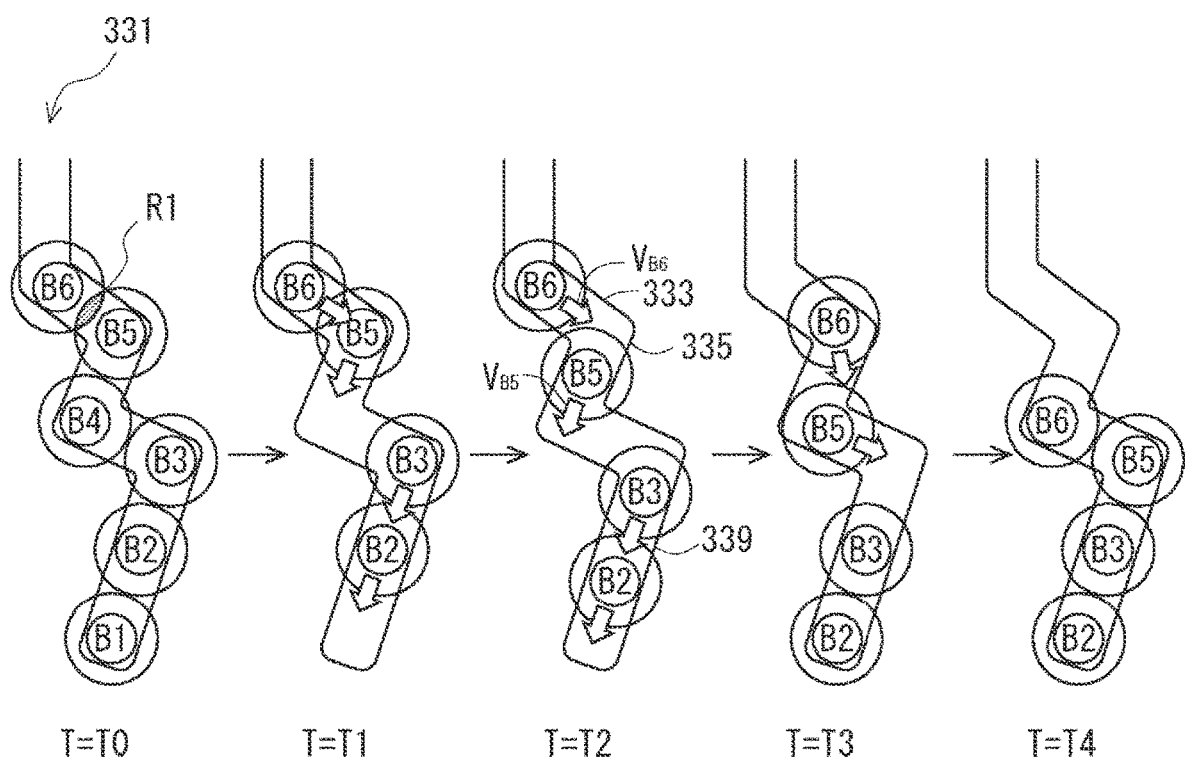
FIG. 22 is a diagram illustrating an example of the movements of bolts dropping in the groove portion.

Next, referring to FIG. 22, the movements of the bolts 9 dropping in the groove portion 331 will be described. FIG. 22 is a diagram illustrating an example of the movements of the bolts 9 dropping in the groove portion 331. In FIG. 22, the groove portion 331 and the positions of the bolts 9 sliding in the groove portion 331 are illustrated with the lapse of time.

FIG. 22 on the left side illustrates a state of the groove portion 331 at time T0. At time T0, bolts B1 to B6 are disposed in the groove portion 331. Since the bolts are disposed in such a way that they can be supplied, the user sets the tool 900 in the bolt supply device 1 and takes out the bolt B1 and the bolt B4.

At time T0, the flange portions of the bolt B5 and the bolt B6 overlap each other in a region R1. This is because the flange portion of the bolt B6 sliding down after the bolt B5 rides on the bolt B5. There are cases where the flange portion of the bolt B6 rides on the bolt B5 in this way due to a force generated on the bolt B6 about the X-axis or a shock caused by collision of the bolt B6 with the bolt B5 when the bolt B6 is released from the bolt stopper 34 as described in FIG. 19.

On the right side of the state at time T0, a state at time T1 after time T0 is illustrated. The state at time T1 is a state immediately after the tool 900 takes out the bolt B1 and the bolt B4. Since the bolt B1 and the bolt B4 are taken out, the remaining bolts start dropping due to gravity.

On the right side of the state at time T1, a state at time T2 after time T1 is illustrated. At time T2, the respective bolts are dropping along the groove portion 331. In this event, the bolt B5 is dropping in the second groove 335 at a speed $V_{B5}$. The bolt B6 riding on the bolt B5 is dropping in the first groove 333 at a speed $V_{B6}$. Herein, as described in FIG. 21, the speed $V_{B5}$ is higher than the speed $V_{B6}$. Therefore, the bolt B5 separates from the bolt B6 so that the state of overlapping of the flange portions is eliminated. The bolt B2 and the bolt B3 are sliding down the fourth groove 339 at approximately the same speed while being in contact with each other.

On the right side of the state at time T2, a state at time T3 after time T2 is illustrated. At time T3, the bolt B2 abuts the lower end of the fourth groove 339 and is stopped. Accordingly, the bolt B3 is also stopped in a state of being in contact with the bolt B2. The bolt B5 and the bolt B6 continue to drop downward in a state of being separated from each other.

On the right side of the state at time T3, a state at time T4 after time T3 is illustrated. At time T4, the bolt B5 is in contact with the bolt B3 and is stopped, and the bolt B6 is in contact with the bolt B5 and is also stopped.

As described above, even when the flange portions of the bolts sliding down from the bolt stopper 34 overlap each other, when the bolts respectively slide down the first groove 333 and the second groove 335, the speed of the bolt sliding down the second groove 335 is higher so that the overlapping of the flange portions is eliminated. Consequently, the bolt supply device 1 can align the bolts at a predetermined position in the bolt take-out portion 12.

While the configuration of the bolt take-out portion 12 has been described, the configuration of the bolt take-out portion 12 is not limited to that described above. For example, in the bolt take-out portion 12, the groove portion 331 may be in a state in which the third groove 337 and the fourth groove 339 are omitted. That is, the bolt supply device 1 may be configured to supply the single bolt 9 to the tool 900. The groove portion 331 may further include a connecting portion or connecting portions and a groove or grooves below the fourth groove 339 so as to supply the three or more bolts 9 to the tool 900. In the bolt supply device 1 in this embodiment, the groove portions 331 are arranged so as to be symmetrical to each other in the right-left direction. However, the arrangement of the groove portions 331 is not limited to the symmetrical arrangement.

As described above, according to this embodiment, it is possible to provide a bolt supply device that is small in size and suppresses the degradation of the work environment.

The disclosure is not limited to the embodiment described above and can be modified as appropriate within the scope not departing from the gist thereof.

What is claimed is:

1. A bolt supply device configured to align bolts in a bolt take-out portion, the bolts each having a head portion including a flange portion and a screw portion protruding from the flange portion, the bolt supply device comprising:
    a slide plate disposed to be inclined to a vertical direction; and
    a groove portion formed in the slide plate, the groove portion having a width that allows passing of the screw portion and prevents passing of the flange portion,
    wherein the groove portion includes:
    a first groove configured such that an angle formed between a line extending in an up-down direction along the slide plate and the first groove is a first angle; and
    a second groove connected to a lower end of the first groove and configured such that an angle formed between the line extending in the up-down direction along the slide plate and the second groove is a second angle smaller than the first angle, and
    wherein the bolt take-out portion is set in the groove portion at a lower end of the second groove or below the lower end of the second groove.

2. The bolt supply device according to claim 1, wherein the second groove is set to a length such that, in a state where the bolts are filled in the bolt take-out portion, a center of the bolt is disposed in a connecting portion connected to the first groove.

3. The bolt supply device according to claim 1, wherein:
    the groove portion further includes a third groove connected to the lower end of the second groove and bent downward at 90 degrees from the second groove along the slide plate; and
    the third groove is set to a length such that, in the state where the bolts are filled in the bolt take-out portion, a center of the bolt is disposed in a connecting portion connected to the second groove.

4. The bolt supply device according to claim 3, wherein:
    the groove portion further includes a fourth groove connected to a lower end of the third groove and bent downward along the slide plate, the fourth groove having a lower end set to the bolt take-out portion; and
    the fourth groove is set to a length such that, in the state where the bolts are filled in the bolt take-out portion, a center of the bolt is disposed in a connecting portion connected to the third groove.

5. The bolt supply device according to claim 3, further comprising a cover at a lower end of the third groove, the cover configured to restrict a movement of the bolt in a direction in which the head portion floats up.

* * * * *